(12) United States Patent
Moriyama et al.

(10) Patent No.: US 7,684,569 B2
(45) Date of Patent: Mar. 23, 2010

(54) ELECTRONIC DEVICE CONTROL SYSTEM AND METHOD AND ELECTRONIC DEVICE, AND CONTROL APPARATUS

(75) Inventors: Yoshiaki Moriyama, Saitama (JP); Toshio Suzuki, Saitama (JP); Kosuke Ajima, Saitama (JP)

(73) Assignee: Pioneer Corporation, Tokyo (JP)

( * ) Notice: Subject to any disclaimer, the term of this patent is extended or adjusted under 35 U.S.C. 154(b) by 1618 days.

(21) Appl. No.: 10/493,032

(22) PCT Filed: Oct. 21, 2002

(86) PCT No.: PCT/JP02/10883
§ 371 (c)(1),
(2), (4) Date: Apr. 19, 2004

(87) PCT Pub. No.: WO03/036860
PCT Pub. Date: May 1, 2003

(65) Prior Publication Data
US 2004/0252840 A1     Dec. 16, 2004

(30) Foreign Application Priority Data
Oct. 19, 2001  (JP) .............................. 2001-322835
Oct. 19, 2001  (JP) .............................. 2001-322836

(51) Int. Cl.
*H04L 9/32* (2006.01)
*G06F 11/30* (2006.01)
(52) U.S. Cl. ....................... 380/277; 713/155; 380/201; 380/229
(58) Field of Classification Search ................. 380/277, 380/200, 201; 713/155
See application file for complete search history.

(56) References Cited

U.S. PATENT DOCUMENTS 7,107,462 B2 *   9/2006  Fransdonk .................. 713/193

(Continued)

FOREIGN PATENT DOCUMENTS

EP        1 143 656        10/2001

(Continued)

OTHER PUBLICATIONS

"Basic of encrypt theory," Japan, Kyoritsu Shuppan Co., Ltd., (Feb. 25, 1993), first impression of the first edition, pp. 110-112 (Eiji Okamoto). Partial English-language translation also attached hereto.

(Continued)

*Primary Examiner*—Nasser G Moazzami
*Assistant Examiner*—Fikremariam Yalew
(74) *Attorney, Agent, or Firm*—Drinker Biddle & Reath LLP

(57) ABSTRACT

In an electronic apparatus control system provided with: a plurality of electronic apparatuses connected to a network covering a predetermined area; and a controller for controlling these electronic apparatuses, the controller (11) is provided with: a generating device for generating a group key peculiar to the network (18) in order to encrypt the information flowing through the network (18); and a wireless unit (21) for transmitting the generated group key to a plurality of the electronic apparatuses. The electronic apparatus is provided with: a memory device for storing the group key transmitted; an encrypting device for encrypting the information flowing through the network (18) using the group key; and a decoding device for decoding the encrypted information using the group key. Owing to this construction, it is possible to present a copy protection improved in the maintainability and reduced in the cost, for protecting copyright effectively even in a case that information is flown out of the network (18).

8 Claims, 21 Drawing Sheets

U.S. PATENT DOCUMENTS

| | | | |
|---|---|---|---|
| 7,231,669 B2 * | 6/2007 | Leung et al. | 726/26 |
| 7,389,272 B2 * | 6/2008 | Kambayashi et al. | 705/59 |
| 2003/0023847 A1 * | 1/2003 | Ishibashi et al. | 713/169 |
| 2004/0010467 A1 * | 1/2004 | Hori et al. | 705/50 |

FOREIGN PATENT DOCUMENTS

| | | |
|---|---|---|
| EP | 1 158 417 | 11/2001 |
| JP | 7-297818 | 11/1995 |
| JP | 8-107412 | 4/1996 |
| JP | 11-122681 | 4/1999 |

OTHER PUBLICATIONS

Menezes et al., "Handbook of Applied Cryptography," CRC Press LLC, XP-002314144, 1997, pp. 546-549.

* cited by examiner

ELECTRONIC DEVICE CONTROL SYSTEM AND METHOD AND ELECTRONIC DEVICE, AND CONTROL APPARATUS

TECHNICAL FIELD

The present invention relates to an electronic apparatus control system and an electronic apparatus control method, which control a plurality of electronic apparatuses connected to a network and information flowing through the network, and an electronic apparatus and a controller constituting the electronic apparatus control system.

BACKGROUND ART

Conventionally, as a facility for sending and receiving information between various electronic apparatuses introduced into a home, for example, such as a television receiver, a video recorder, a DVD apparatus, a personal computer and the like, a system has been proposed for establishing in the home a network to connect those electronic apparatuses to each other by using various interfaces.

However, if the network through which those electronic apparatuses are connected to each other is established in the home, for example, this home network and an external network are connected to each other through the Internet and the like. Consequently, information reproduced or reconstructed in the home, for example, a picture information reproduced by a DVD apparatus can be instantly distributed to many and unspecified persons. This results in a problem that the copyright of its content cannot be sufficiently protected.

As this counter-plan, a copy protection system is proposed for inserting, for example, a memory card recording a control information, into each electronic apparatus, and limiting a copy of information received or reproduced by the electronic apparatus, and thereby preventing the information from being limitlessly escaped, and consequently protecting the copyright. In this method, a common encryption key (hereafter, suitably referred to as "Group Key") is assigned to an electronic apparatus connected to a network in a home. The group key is recorded on the memory card. The information is encrypted using the group key that is recorded on the memory card. Therefore, the information cannot be reconstructed if the group key is not known even in a case that the information is externally escaped. Consequently the copyright is protected.

For example, a content outputted from an information receiver (hereafter, suitably referred to as "STB: Set Top Box") is encrypted using a group key in a memory card inserted into the STB, and this encrypted content is decoded and displayed using the group key in a memory card inserted into a television monitor. Thus, even if the encrypted content is escaped into an external network, the content is never decoded unless there is the same group key as the group key used for the encryption.

However, the above-mentioned method involves the unit for inserting the memory cards into the respective electronic apparatuses, which results in the factor of an increase in a cost and restricts the miniaturization of the apparatus.

Furthermore, there is a further inconvenience in the above-mentioned method, i.e. only the electronic apparatuses to which the group key is assigned can reproduce the content information, while other electronic apparatuses to which the group key is not assigned cannot handle the content information whatever its kind or nature.

DISCLOSURE OF INVENTION

The present invention is proposed in view of the above-mentioned problems. It is therefore an object of the present invention to provide an electronic apparatus control system and an electronic apparatus control method that have a copy protection performance of an excellent maintenance at a low cost, in which even if a content is escaped from a home network to an external network, its copyright can be protected, and further to provide an electronic apparatus and a controller constituting the electronic apparatus control system.

Furthermore, it is a second object of the present invention to provide an information recording apparatus and an information reproducing method by which content information whose copy right is to be protected can be handled also by other electronic apparatuses under a certain condition, and further to provide a computer program and a recording medium.

The above object of the present invention can be achieved by an electronic apparatus control system provided with: an electronic apparatus on an output side for outputting information to a network covering a predetermined area; an electronic apparatus on an input side for receiving the information outputted to the network; and a controller for controlling the electronic apparatus on the output side and the electronic apparatus on the input side, (i) the controller provided with: a generating device for generating an encryption key peculiar to the network in order to encrypt the information flowing through the network; and a transmitting device for transmitting the generated encryption key to a plurality of the electronic apparatuses, (ii) the electronic apparatus on the output side provided with: a memory device for storing the encryption key transmitted from the controller; and an encrypting device for encrypting the information in accordance with the encryption key, (iii) the electronic apparatus on the input side provided with: a memory device for storing the encryption key transmitted from the controller; and a decoding (or decrypting) device for decoding (or decrypting) the encrypted information in accordance with the encryption key.

According to the electronic apparatus control system of the present invention, the electronic apparatus, such as a television receiver, a video recorder, a DVD apparatus, and a personal computer, is connected to the network designed to cover a certain area in a mutually-information-transmittable condition, and so is the controller for controlling the information transmission, processing, copying, and the like of the electronic apparatus and those between them.

The controller generates with the generating device the encryption key (which is referred to as "a group key" hereinafter as occasion demands) peculiar to the network to encrypt the information flowing between various electronic apparatuses connected to the network, e.g. the information on the contents of music, pictures, a program, or the like. Moreover, the controller has the function of transmitting it with the transmitting device to various electronic apparatus connected to the network. As the transmitting mechanism, a wireless unit is used, for example, such as an infrared communication unit, and an electric wave communication unit proposed as a Bluetooth standard used for the communication of a short distance with a weak output.

The electronic apparatus has the functions of storing the group key transmitted from the controller into the memory device, encrypting with the encrypting device the information outputted to the network from the electronic apparatus using the group key, and decoding with the decoding device the encrypted information imported from the network.

Namely, since these electronic apparatuses connected to the network covering a predetermined area have the group key to encrypt and decode the mutual information, the operation of the electronic apparatus and the mutual operation of them are controlled on the basis of a license condition, such as the information transmission, processing, and copying, that the group key has.

Therefore, the electronic apparatus that does not have the group key on this network, for example, the electronic apparatus that is connected to another network cannot treat the information encrypted in the above manner. Therefore, even if the information flows out of the network, the electronic apparatus other than the network cannot restore nor copy it, and thus it is possible to prevent an infringement of the copyright of the information. Moreover, the secrecy is kept.

In one aspect of the electronic apparatus control system of the present invention, the controller has the function of a cellular phone.

According to this aspect, the cellular phone is used as the controller, and it is extremely useful in practice.

In this aspect, the generating device may generate the encryption key on the basis of the peculiar number of the cellular phone.

By constituting in this manner, since the group key is generated on the basis of the peculiar number of the cellular phone, e.g. a phone number, it is possible to prevent the generation of the same group key in another network relatively simply and surely.

In another aspect of the electronic apparatus control system of the present invention, the controller is provided with: an obtaining device for obtaining a license information related to the encryption key by accessing a management center for managing the license information to be provided; and a transmission controlling device for controlling the transmission of the encryption key at the transmitting device on the basis of the obtained license information.

According to this aspect, it becomes possible to connect to the management center for managing the license information through a communication line by using the function of the cellular phone, and obtain the license information on the group key of the network, and further control the transmission of the group key from the controller to various electronic apparatuses on the basis of the obtained license information condition. Namely, only one controller is required for obtaining the group key and transmitting it to the electronic equipment, which is convenient and excellent in operability and maintainability.

In another aspect of the electronic apparatus control system of the present invention, the controller is provided with: a loading unit for loading therein a detachable memory device in which a license information is stored; and a transmission controlling device for controlling the transmission of the encryption key at the transmitting device on the basis of the license information stored in the detachable memory device loaded in the loading unit.

According to this aspect, there is a memory card for recording number information to control the transmission number of the encryption key, for example, using a semiconductor memory, as the detachable memory device, and loading this semiconductor memory into the controller causes the transmission number of the encryption key to be controlled. In the case where the information on the transmission number or the like is received as the memory card, this is loaded into the controller to start controlling. In the case of controlling with another controller, only replacing this memory card is required so that it is possible to transmit with the remaining transmission number held.

Moreover, if related to this license information, the license information may include information on the transmission number of the encryption key, and the transmission controlling device may control the transmission number of the encryption key at the transmitting device on the basis of the information on the transmission number of the encryption key.

By constituting in this manner, if the license information is that up to five electronic apparatuses can obtain the group key, the number information is included, the number is countdowned whenever the controller transmits the group key to the electronic apparatuses, and the transmission ends after giving the group key to the five apparatuses. The electronic apparatus to which this group key is given becomes able to treat, in the network, the information to be flown through the network according to the license condition. If the group key is not given, even if connected to the network, the electronic apparatus cannot treat the information flown through the network.

Incidentally, as the license condition, not only the communication number or the number of the electronic apparatuses, but also its expiration date, acceptable operation types, and the like are conceivable. Moreover, it is possible to decide the license charge of the content according to the above described condition.

In another aspect of the electronic apparatus control system of the present invention, the controller has the function of a remote control device provided with an operating unit for controlling the operation of the plurality of electronic apparatuses.

According to this aspect, the remote control function of the electronic apparatus and the controller is unified, an information transmission unit to the electronic apparatus using an infrared ray can be shared as the transmitting device of the group key, and thus it is not necessary to equip another specific transmitting device. Therefore, that contributes to the miniaturization and the low cost of the apparatus.

In this aspect, the controller may be provided with: a loading unit for loading therein a detachable memory device in which a license information is stored; and a transmission controlling device for controlling the transmission of the encryption key at the transmitting device on the basis of the license information stored in the detachable memory device loaded in the loading unit.

By constituting in this manner, the controller unified with the remote control function of the electronic apparatus has the functions of storing with the detachable memory device the license information of the encryption key provided from the management center and controlling the transmission of the encryption key to the electronic apparatus on the basis of the stored license information. In this case, there is a memory card, for example, using a semiconductor memory, as the detachable memory device, and it is loaded into the controller by the detachable loading unit.

In this case, moreover, the license information may include information on the transmission number of the encryption key, and the transmission controlling device may control the transmission number of the encryption key at the transmitting device on the basis of the information on the transmission number of the encryption key.

By constituting in this manner, the controller unified with the remote control function of the electronic apparatus transmits the group key to the electronic apparatus on the basis of the license condition about the transmission number provided from the management center. The infrared communication unit of a remote control apparatus is used as the transmitting device.

In another aspect of the electronic apparatus control system of the present invention, the electronic apparatus on the output side is further provided with a forbidding unit for forbidding the output of information to be flown through the network to the network.

According to this aspect, after confirming that the group key is surely imported to the electronic apparatus, only accurate information operated according to the group key condition is flown through the network, and thus another electronic apparatus becomes able to treat accurate information on the basis of the information.

In another aspect of the electronic apparatus control system of the present invention, the network is established with a home environment as the predetermined area.

According to this aspect, one house becomes the area that one network covers, and the electronic apparatuses connected to this come to have the mutual group key. Therefore, the members of the family become able to freely treat the information within a range of the license condition of the group key, using their own electronic apparatuses or the mutual electronic apparatus.

In another aspect of the electronic apparatus control system of the present invention, the network is connected to an external network through a communication unit.

According to this aspect, the connection between individual networks becomes possible. Consequently, it becomes possible to transmit the freely treated information beyond the individual network.

The above object of the present invention can be achieved by an electronic apparatus control method provided with: an electronic apparatus on an output side for outputting information to a network covering a predetermined area; an electronic apparatus on an input side for receiving the information outputted to the network; and a controller for controlling the electronic apparatus on the output side and the electronic apparatus on the input side, the method executing: (i) at the controller, a generating process of generating an encryption key peculiar to the network in order to encrypt the information flowing through the network; and a transmitting process of transmitting the generated encryption key to a plurality of the electronic apparatuses, (ii) at the electronic apparatus on the output side, a memory process of storing the encryption key transmitted from the controller; and an encrypting process of encrypting the information in accordance with the encryption key, and (iii) at the electronic apparatus on the input side, a memory process of storing the encryption key transmitted from the controller; and a decoding (or decrypting) process of decoding (or decrypting) the encrypted information in accordance with the encryption key.

According to the electronic apparatus control method of the present invention, as is the case with the above described electronic apparatus control system of the present invention, since the electronic apparatuses connected to the network covering the predetermined area have the group key to encrypt and decode the mutual information, the operation of the electronic apparatus and the mutual operation of them are controlled on the basis of the license condition of the group key. On the other hand, the electronic apparatus that does not have the group key on this network cannot treat the information encrypted, and even if the information flows out of the network, the electronic apparatus other than the network cannot restore nor copy it.

The above object of the present invention can be achieved by one electronic apparatus on an output side controlled by a controller capable of generating and transmitting an encryption key peculiar to a network covering a predetermined area, as well as outputting information to the network, the apparatus provided with: a memory device for storing the encryption key transmitted from the controller; and an encrypting device for encrypting the information outputted to the network in accordance with the encryption key.

According to an electronic apparatus of the present invention, the electronic apparatus, such as a television receiver, a video recorder, a DVD apparatus, and a personal computer, stores the group key transmitted form the controller with the memory device, encrypts with the encrypting device the information flowing through the network using the group key, or decodes with the decoding device the information encrypted in accordance with the group key. Therefore, as is the case with the above descried electronic apparatus control system, even if the information is flown out of the network, it is possible to effectively protect the copyright.

Incidentally, an electronic apparatus of the present invention can employ the same various aspects as those in the above described electronic apparatus control system of the present invention.

The above object of the present invention can be achieved by a controller connected to a network covering a predetermined area, the controller provided with: a generating device for generating an encryption key peculiar to the network; and a transmitting device for transmitting the generated encryption key to the electronic apparatus.

According to the controller of the present invention, it generates with the generating device the encryption key peculiar to the network to encrypt the information on the contents of music, pictures, a program, or the like, and further transmits the information with the transmitting device to various electronic apparatus connected to the network. Therefore, as is the case with the above descried electronic apparatus control system, even if the information is flown out of the network, it is possible to effectively protect the copyright.

Incidentally, the controller of the present invention can employ the same various aspects as those in the above described electronic apparatus control system of the present invention.

The above object of the present invention can be achieved by another electronic apparatus on an input side controlled by a controller for transmitting an encryption key peculiar to a network covering a predetermined area, as well as inputting information flowing though the network, the apparatus provided with: a memory device for storing the encryption key transmitted from the controller; and a decoding device for decoding the information inputted from the network in accordance with the encryption key.

According to said another electronic apparatus of the present invention, as is the case with the above descried electronic apparatus control system, even if the information is flown out of the network, it is possible to effectively protect the copyright.

Incidentally, said another electronic apparatus of the present invention can employ various aspects the same as those in the above-described electronic apparatus control system of the present invention.

Thus, according to the electronic apparatus control system and method, as well as the electronic apparatus and the control apparatus, the copy protection system by which the copyright of the content is effectively protected can be presented, even in a case that the content is leaked from the home network to the external network.

The above object of the present invention can be achieved by an information recording apparatus for recording record information into a record medium, the record information being encrypted using a group key that is assigned to a group consisting of one or more electronic apparatuses, the information recording apparatus comprising: a detecting device for detecting copyright information about the record information; a converting device for converting the record information into a inter-group common format in which even electronic apparatuses belonging to another group can handle the record information; a recording device for recording the record information converted into the inter-group common format on the basis of the copyright information into the record medium.

In the above-mentioned electronic apparatus control system, in view of the copyright protection or the confidence of information, the record information is distributed in the encrypted state based on the predetermined group key (encryption key). Therefore, in order to record, reproduce or duplicate the record information, the record information is to be decoded using the group key. This group key is assigned only to the electronic apparatuses belonging to a certain group. For example, the group key is assigned only to the electronic apparatuses connected to a certain network covering a certain area. Thereby, only the electronic apparatuses belonging to the certain group can record, reproduce or duplicate the record information. Thus, limiting the handling of the record information, the copyright or the confidence of the record information can be protected. The information recording apparatus according to the present invention is of the apparatus for recording the record information, which is encrypted using the group key, into the record medium.

According to the information recording apparatus of the preset invention, firstly, the information recording apparatus obtains a certain form of the record information, which is encrypted using the group key. The record information includes the copyright information therein. The detecting device detects this copyright information. This copyright information is of indicating a condition about at least one of the recording, reproducing and duplicating of the record information, for example, the permission or prohibition of the duplication, including the duplicating history information sometimes.

On the other hand, the converting device converts a format of the record information, which is encrypted using the group key, into the inter-group common format. The inter-group common format is a format in which even an electronic apparatus belonging to another group different from the aforementioned certain group can handle the record information.

Then, the recoding device records the record information, which is converted into the inter-group common format, into the record medium, on the basis of the copyright information. For this, the recording device may be arranged so that only the record information is recorded into the record medium, or may be arranged so that the record information is recorded into the record medium, with the copyright information.

Thus, the record information, which is encrypted using the group key, is converted into the inter-group common format and then recorded into the record medium. Thereby, the record information recorded into the record medium can be recorded, reproduced or duplicated not only by the electronic apparatus belonging to the certain group, but also by the electronic apparatus belonging to another group. Nevertheless, since the record information recorded into the record medium is recorded in the inter-group common format, the recording, reproducing or duplicating of the record information is not permitted with no limitation. Only certain electronic apparatuses capable of decoding the inter-group common format are permitted to record, reproduce or duplicate the record information.

Thus, a way in which only certain electronic apparatuses is permitted to record, reproduce or duplicate the record information, by encrypting the record information using the group key, is advantageous in view of the copyright protection of the confidence of the record information. Only with this way, however, a difficulty may arise in a practical use, because the limitation against the handling of the record information is too severe. On the contrary, according to the information recording apparatus of the present invention, the limitation against the handling of the record information can be loosened to an appropriate extent, because the record information, which is encrypted using the group key, is converted into the inter-group common format and then recorded. Furthermore, if a case that the information recording apparatus can convert the record information, which is encrypted using the group key, into the inter-group common format is limited under a predetermined condition, the copyright protection or the confidence of the record information can be advantageously balanced with the utilization of the record information. Consequently, the distribution order of the record information can be appropriately achieved.

In an aspect of the information recording apparatus of the present invention, the recording device records the record information converted into the inter-group common format into the record medium in the case that the copyright information indicates that the record information is allowed to be transferred to a record medium that is mounted on the information recording apparatus belonging to another group, and said recording device records the record information encrypted using the group key that is assigned to the group into the record medium in the case that the copyright information indicates that the record information is not allowed to be transferred to the record medium that is mounted on the information recording apparatus belonging to another group.

According to this aspect, it is determined, on the basis of the copyright information, whether the record information, which is encrypted using the group key, is converted into the inter-group common format and then recorded into the record medium, otherwise whether the record information, which is encrypted using the group key, is recorded into the record medium in the encrypted state. Thereby, on the basis of the copyright information, the copyright protection or the confidence of the record information can be appropriately balanced with the utilization of the record information.

In another aspect of the information recording apparatus of the present invention, the information recording apparatus further including: a decoding device for decoding the encrypted record information using the group key, the detecting device inputting the decoded record information and detecting the copyright information about the record information.

According to this aspect, if the record information, which is encrypted using the group key, is required to be decoded in order to detect the copyright information attached to the record information, the decoding device decodes the record information, on the basis of the group key. Then, the detecting device detects the copyright information from the record information. For example, at the initial stage in that the information recording apparatus obtains the record information, the copyright information attached to the record information is sometimes encrypted with the record information, using the group key. In this case, the copyright information can be appropriately detected, according to the aspect of the present invention.

In this aspect, furthermore, the detecting device may be made of a formatter for converting the decoded record information into a format according to the inter-group common format, and a scramble circuit for encrypting the formatted record information, using a key according to the inter-group common format.

According to this arrangement, the format of the record information is converted to the inter-group common format by the formatter. Then, the scramble circuit encrypts the record information, using the key according to the inter-group common format. Then, the encrypted record information is recorded into the record medium by the recording device. The record information that is recorded through these processings can be handled only by the electronic apparatuses permitted to decode the information using the key according to the inter-group common format. Therefore, the copyright protection and the confidence of the record information can be appropriately balanced with the utilization of the record information.

Furthermore, in this aspect, the scramble circuit may be arranged to include a first state in that the formatted record information is encrypted using the key according to the inter-group common format, and a second state in that the formatted record information is encrypted using the group key.

According to this arrangement, the scramble circuit is set to the first state, if it is permitted for the record information to be moved into the record medium inserted into the information recording apparatus belonging to another group. In this case, the scramble circuit encrypts the record information, using the key according to the inter-group common format. On the other hand, the scramble circuit is set to the second state, if it is prohibited for the record information to be moved into the record medium inserted into the information recording apparatus belonging to another group. In this case, the scramble circuit encrypts the record information, using the group key.

In this arrangement, furthermore, the information recording apparatus may be arranged to encrypt the record information, using a group key different from the group key used for encrypting the record information initially obtained, in the case that the scramble circuit is set to the second state and encrypts the record information using the group key. That is, assume that the record information when it is initially obtained is encrypted, using the first group key assigned to the aforementioned certain group. In this case, the decoding device may be arranged to decode the record information, which is encrypted using the first group key, using the first group key, the scramble circuit or the encrypting device may be arranged to encrypt the decoded record information by the decoding device, using the second group key assigned to the aforementioned certain group.

Thereby, using a plurality of group keys as appropriate, it is possible to define two or more kinds of limitation with regard to the record information, and thereby define various utilization ranges of the record information.

On the other hand, the information recording apparatus according to the present invention may be arranged as follows, instead of the arrangement so that the scramble circuit can take the first state and the second state. That is, the information recording apparatus according to the present invention may be provided with: an encrypting portion for encrypting the record information, which is formatted by the formatter, using the group key; and a switch for selecting either one of the record information, which is encrypted using the group key at the encrypting portion, and the record information, which is encrypted using the key according to the inter-group common format at the scramble circuit.

According to this arrangement, the scramble circuit encrypts the record information, which is converted into the inter-group common format by the aforementioned formatter, using the key according to the inter-group common format. On the other hand, the encrypting portion encrypts the record information, which is converted into the inter-group common format by the aforementioned formatter, using the group key. Owing to these processings of the scramble circuit and the encrypting portion in a parallel manner, the record information encrypted using the key according to the inter-group common format, and the record information encrypted using the group key can be obtained, in the information recording apparatus. Furthermore, the aforementioned switch selects either one of these two kinds of record information. For example, in the case that either one of these two kinds of record information is selected and then recorded into the record medium, the record information to be recorded is selected by shifting the switch before starting the record operation.

On the other hand, in the aforementioned arrangement, with regard to the record information already converted into the inter-group common format by the formatter, the encryption using the key according to the inter-group common format and the encryption using the group key is executed in a parallel manner, and either one of two kinds of record information obtained as the result is selected by shifting the switch. Nevertheless, the present invention is not limited to this arrangement, and may be arranged as follows. That is, the information recording apparatus according to the present invention may be arranged to include an encrypting portion for encrypting the record information, which is formatted by the formatter, using the group key, and a switch for selecting either one of the record information, which is encrypted using the group key at the encrypting portion, and the record information, which is formatted by the formatter, and for outputting the selected one to the scramble circuit.

According to this arrangement, the record information, which is converted into the inter-group common format by the formatter, is supplied to the switch via two routes. That is, the first route is for supplying the record information, which is converted into the inter-group common format by the formatter, to the switch through the encrypting portion. The encrypting portion encrypts the record information, which is converted into the inter-group common format by the formatter, using the group key, and outputs the encrypted record information to the switch. On the other hand, the second route is for supplying the record information, which converted into the inter-group common format by the formatter, to the switch, as it is. Then, the switch selects either one of these two kinds of record information supplied via these two routes, respectively. The record information selected by the switch is outputted to the scramble circuit, then subjected to processings at the scramble circuit and so on, and then recorded into the record medium.

On the other hand, the information recording apparatus according to the present invention may be arranged as follows. That is, it may be provided with: a decoding device for decoding the record information, which is encrypted using the group key, using the group key; a detecting device for detecting the copyright information from the decoded record information; a converting device for converting the record information into the inter-group common format in which even electronic apparatuses belonging to another group can handle the record information; an encrypting portion for encrypting the decoded record information, using the group key assigned to the group; a switch for selecting either one of the record information, which is encrypted by the aforementioned encrypting portion, and the record information, which is converted by the converting portion; and a recording device for recording the record information, which is selected by the switch, into the aforementioned record medium.

According to this arrangement, the record information obtained by the information recording apparatus (when initially obtained, the record information is in the encrypted state based on the group key) is decoded, by the decoding device using the group key. Then, the converting device converts the record information, which is decoded by the decoding device, into the inter-group common format. On the other hand, the encrypting portion encrypts the record information, which is decoded by the decoding portion, using the group key. As a result, the record information, which is converted into the inter-group common format, and the record information, which is encrypted using the group key can be obtained, in the information recording apparatus. Then, the aforementioned switch selects either one of these two kinds of record information. Then, the recording device records the record information, which is selected by the switch, into the record medium. According to this arrangement also, it is possible to select suitably whether the record information is to be recorded in the encrypted state based on the group key, otherwise whether the record information is to be recorded in the state of the inter-group common format without being subjected to the encryption. Thereby, the copyright protection and the confidence of the record information can be balanced with the utilization of the record information.

In this arrangement, furthermore, when the record information is encrypted by the encrypting portion, this encryption may be performed using a group key different from the group key used for encrypting the record information that is initially obtained by the information recording apparatus. That is, assume that the record information, when initially obtained, is encrypted using the first group key assigned to the aforementioned certain group. In this case, the decoding device may be arranged to decode the record information that is encrypted using the first group key using the first group key, while the encrypting portion may be arranged to encrypt the record information that is decoded by the decoding device using the second group key assigned to the aforementioned certain group.

Thereby, using a plurality of group keys, it is possible to define two or more kinds of limitations with regard to the record information, and thereby define various utilization ranges of the record information.

On the other hand, the information recording apparatus according to the present invention may be arranged as follows. That is, the copyright information that is not subjected to the encryption based on the group key is sometimes attached to the record information. In this case, the aforementioned detecting device is arranged to detect the copyright information attached to the record information.

In the case that the copyright information that is not subjected to the encryption based on the group key attaches to the record information, the copyright information can be detected without decoding the record information. Therefore, the detecting device can detect the copyright information attached to the record information, regardless whether the record information is in the encrypted state or the decoded state.

Furthermore, in this arrangement, it may be provided with: a decoding device for decoding the encrypted record information using the group key and outputting the decoded record information to the converting device; a switch for selecting either one of the record information that is encrypted and the record information that is converted into the inter-group common format by the converting device.

According to this arrangement, the record information that is obtained by the information recording apparatus (when initially obtained, the record information is in the encrypted state based on the group key) is supplied to the switch via two routes. The first route is for supplying the record information that is obtained by the information recording apparatus to the switch through the decoding device and the converting device, sequentially. As a result, the record information that is obtained by the information recording apparatus is decoded by the decoding device using the group key, then converted into the inter-group common format by the converting device and then supplied to the switch. On the other hand, the second route is for supplying the record information that is obtained by the information recording apparatus to the switch, as it is, that is, in the encrypted state based on the group key. Then, the switch selects either one of the record information that is converted into the inter-group common format and the record information that is encrypted using the group key. The record information that is selected by the switch is recorded into the record medium by the recording device. According to this arrangement also, it is possible to select suitably whether the record information is to be recorded in the encrypted state based on the group key, otherwise whether the record information is to be recorded in the state of inter-group common format. Therefore, the copyright protection or the confidence of the record information can be advantageously balanced with the utilization of the record information.

On the other hand, in the aforementioned arrangement, the switch selects either one of the record information that is decoded using the group key and then converted into the inter-group common format in the first route, and the record information that is in the encrypted state from when initially obtained. Nevertheless, the present invention is not limited to this arrangement. That is, it may be provided with: a decoding device for decoding the encrypted record information, using the group key; a switch for selecting either one of the encrypted record information and the record information that is decoded by the decoding device. In this case, the converting device is arranged to further encrypt the encrypted record information using a key according to the inter-group common format in the case that the encrypted record information is inputted due to the selection of the switch, on the other hand, the converting device is arranged to encrypt the decoded record information using a key according to the inter-group common format in the case that the record information that is decoded by the decoding device is inputted.

According to this arrangement, the record information that is obtained by the information recording apparatus (when initially obtained, the record information is in the encrypted state based on the group key) is supplied to the switch via two routes. The first rout is for supplying the record information, which is obtained by the information recording apparatus, to the switch through the decoding device. As a result, the record information that is obtained by the information recording apparatus is decoded by the decoding device using the group key, and then supplied to the switch. On the other hand, the second route is for supplying the record information, which is obtained by the information recording apparatus, to the switch, as it is, that is, in the encrypted state based on the group key. Then, the switch selects either one of the record information that is decoded, and the record information that remains in the encrypted state. Then, the converting device further encrypts (i.e. encrypts doubly) the encrypted record information using the key according to the inter-group common format in the case that the switch selects inputting the encrypted record information, on the other hand, encrypts the decoded record information using the key according to the inter-group common format in the case that the decoding device inputs the decoded record information. The record information that is subjected to the processing in the converting device is recorded into the record medium by the recording device. According to such an arrangement also, two kinds of record information different from each other in their encryption level or encryption type can be selectively recorded into the record medium. Thereby, the copyright protection and the confidence of the record information can be balanced with the utilization of the record information.

The above object of the present invention can be achieved by an information recording method of recording record information encrypted using a group key assigned to a group consisting of one or more electronic apparatuses into a record medium, the information recording method including: a detecting process of detecting copyright information about the record information; a converting process of converting the record information into an inter-group common format in which even electronic apparatuses belonging to another group can handle the record information; and a recording process of recording the record information converted into the inter-group common format into the record medium under a condition indicated by the detected copyright information.

According to the information recording method of the present invention, since the record information that is encrypted using the group key is recorded after subjected to the conversion into the inter-group common format, the limitation against the handling of the record information can be loosened to the appropriate extent. Then, if the case that the record information that is encrypted using the group key can be converted into the inter-group common format is limited under the predetermined condition, the copyright protection and the confidence of the record information can be balance with the utilization of the record information, resulting in the appropriate distribution order of the record information.

Furthermore, the aforementioned information recording apparatus according to the present invention and various aspects thereof may be not only constructed by hardware, but also constructed by software. That is, the present invention may be a computer program that allows components for constructing the aforementioned information recording apparatus and various aspects thereof to be embodied by a computer. Such a computer program can be read from the record medium such as a CD-ROM, DVD-ROM or the like, or can be downloaded via the communication device such as Internet or the like, otherwise can be loaded into a microprocessor for controlling the operation of the information recording apparatus, to be shared.

The above object of the present invention can be achieved by a record medium in which copyright information and record information converted into an inter-group common format are recorded.

According to the record medium having such a structure, the record information can be handled only by the electronic apparatuses capable of decoding the inter-group common format, and the copyright management based on the copyright information can be achieved among these electronic apparatuses.

The aforementioned effects and other advantages of the present invention will be apparent from the following "Best Mode or embodiments" explained next.

BEST MODE FOR CARRYING OUT THE INVENTION

The embodiments of the present invention will be hereinafter explained with reference to the drawings.

Figure 1:
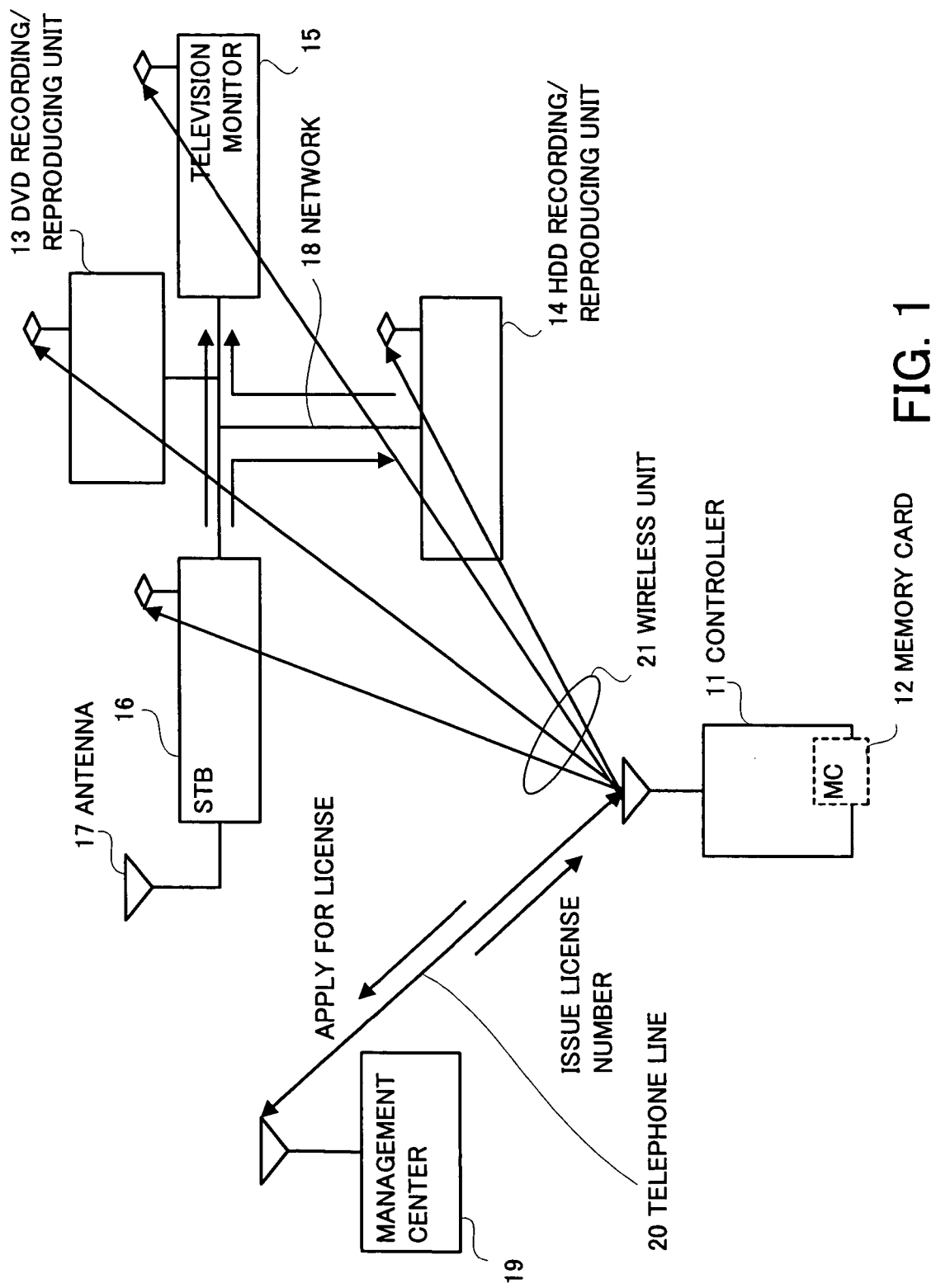
FIG. 1 is a block diagram showing one configuration example of an electronic apparatus control system which is an embodiment of the present invention.
Figure 2:
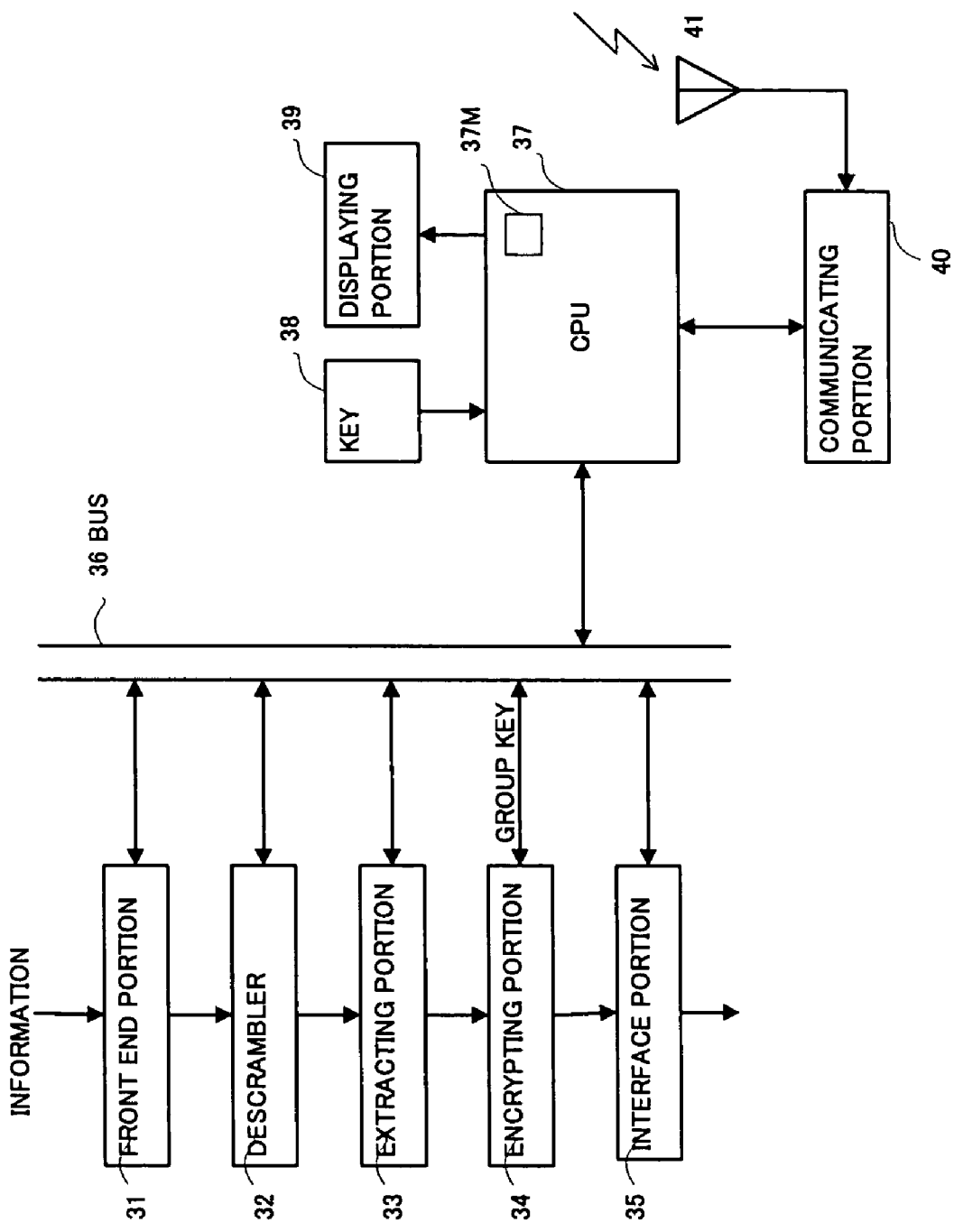
FIG. 2 is a block diagram showing a configuration of STB according to an electronic apparatus control system in this embodiment.
Figure 3:
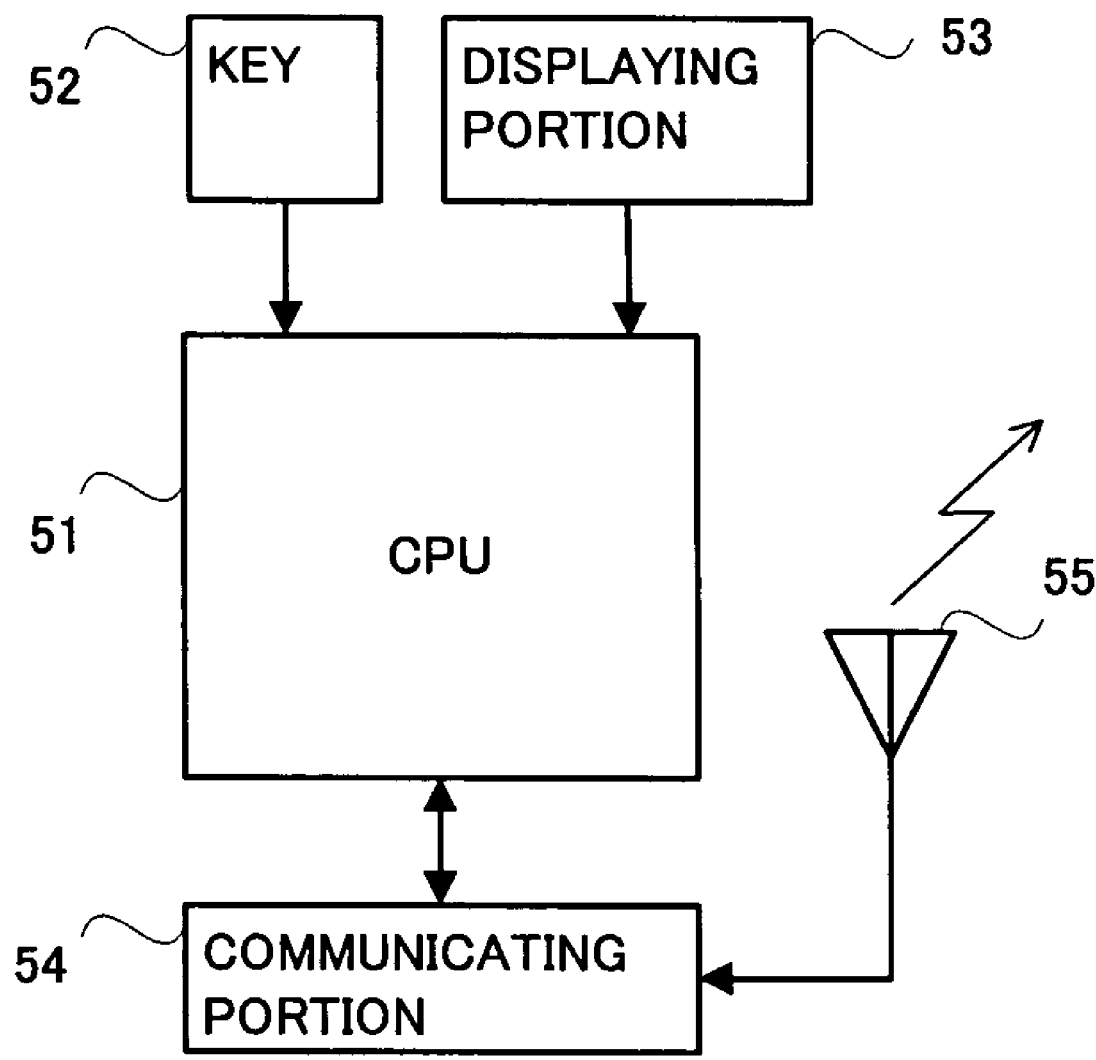
FIG. 3 is a block diagram showing a configuration of an example of a controller according to an electronic apparatus control system in this embodiment.
Figure 4:
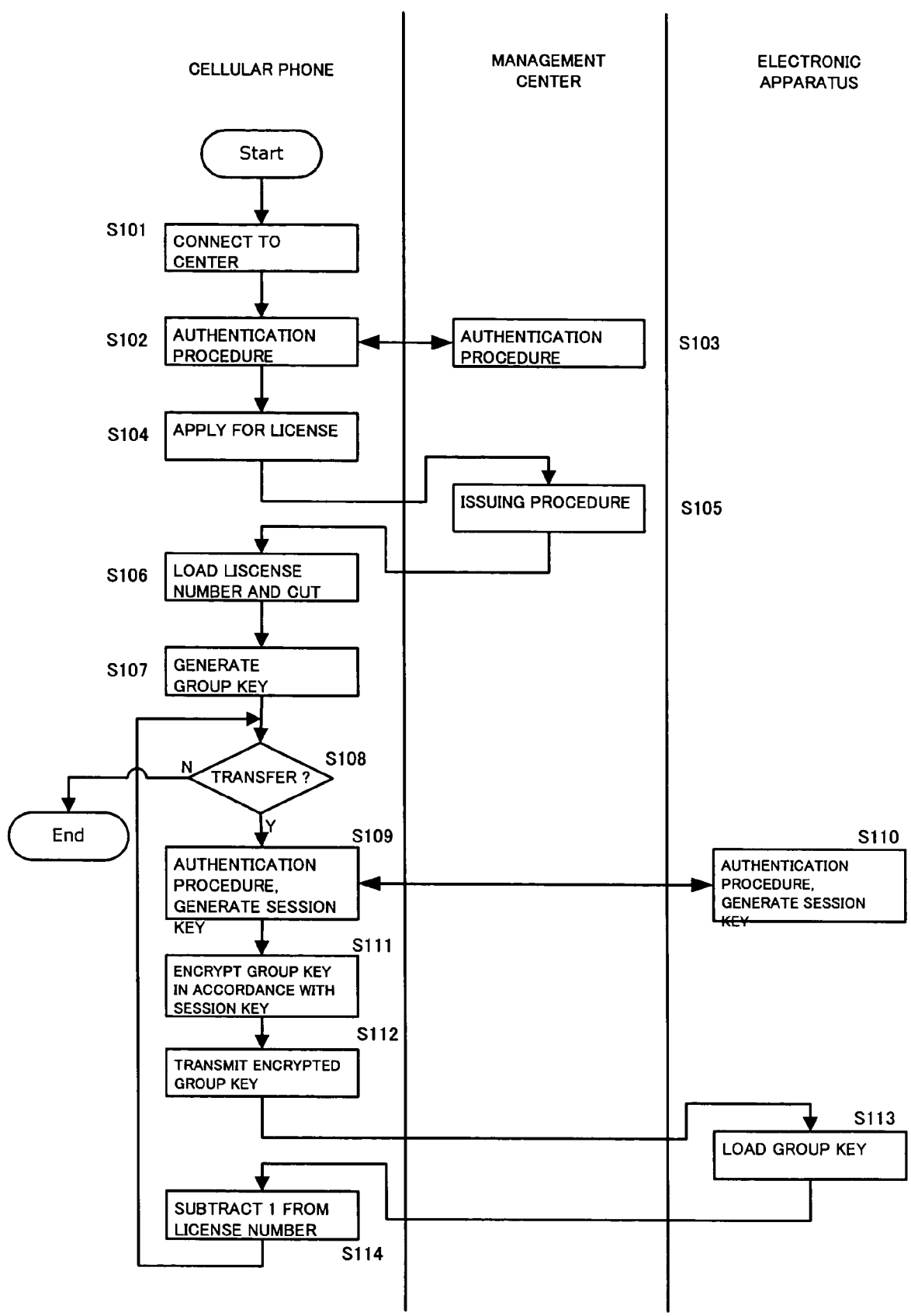
FIG. 4 is a sequence chart of an electronic apparatus control system in this embodiment.
Figure 5:
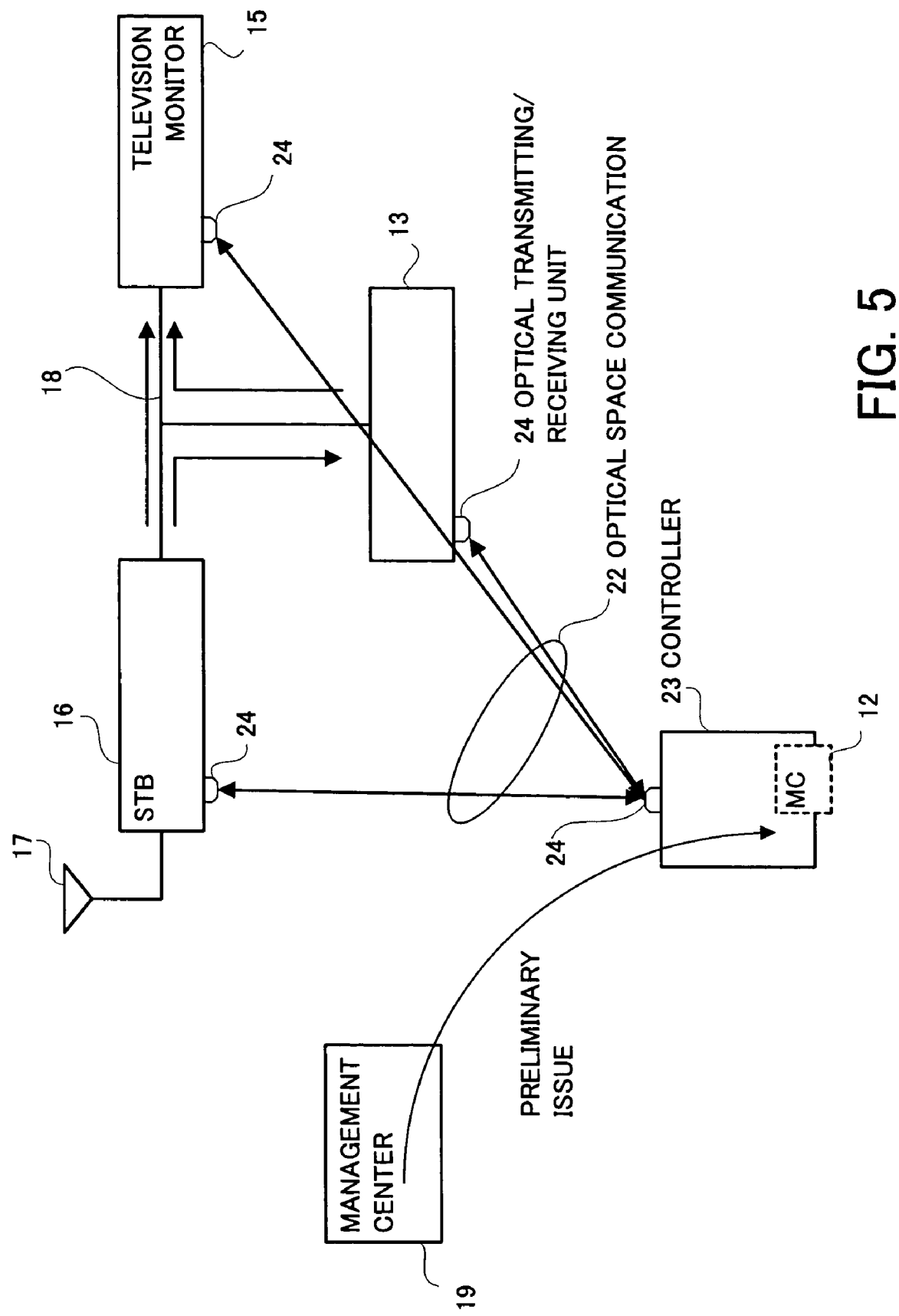
FIG. 5 is a block diagram showing another configuration example of an electronic apparatus control system which is this embodiment.
Figure 14:
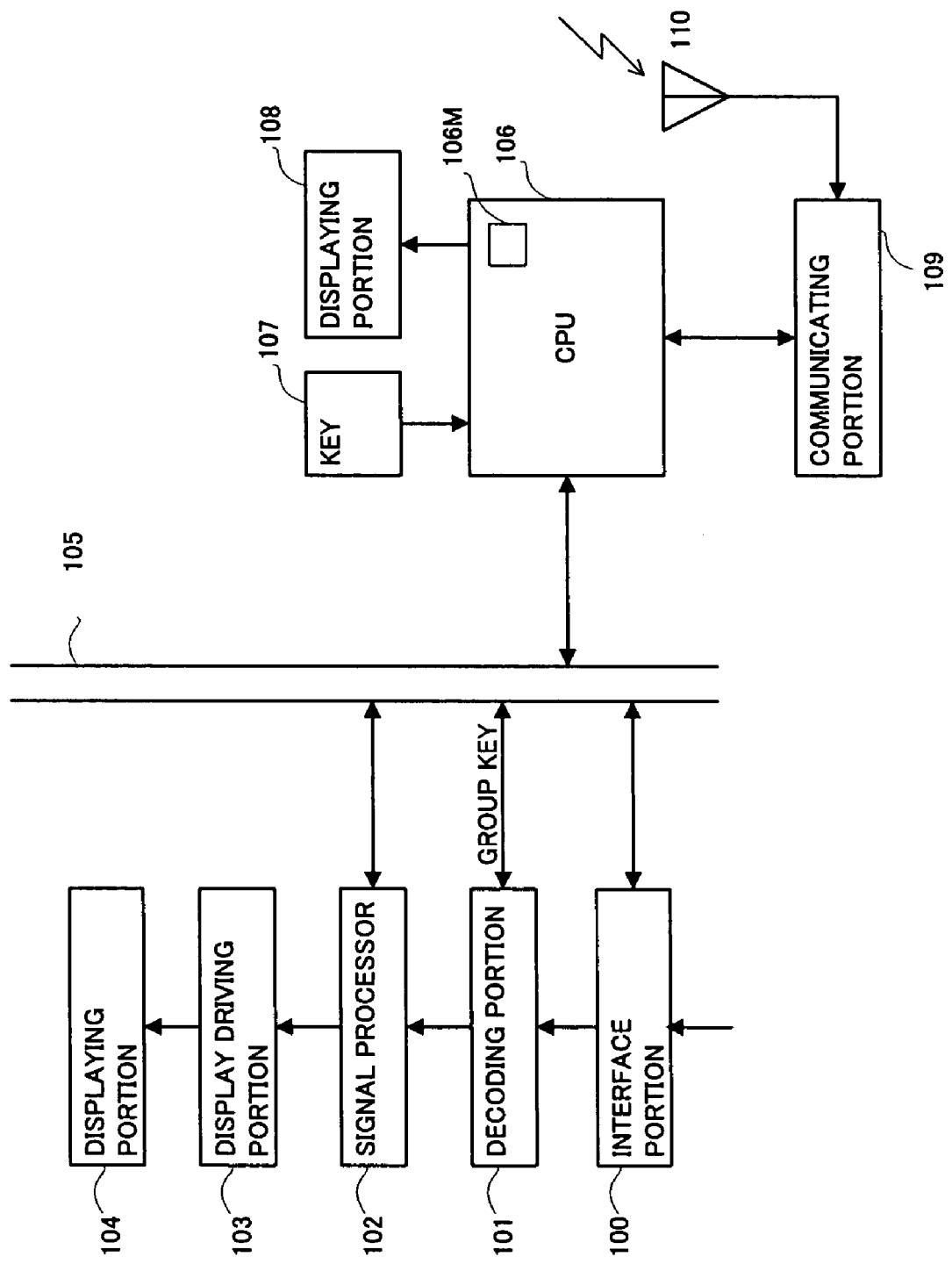
FIG. 14 is a block diagram showing one configuration example of a television receiver according to this embodiment.

The configuration and the operation of the embodiment will be described below with reference to FIGS. 1 to 5 and FIG. 14. Here, FIG. 1 is a block diagram showing one configuration example of an electronic apparatus control system in this embodiment, FIG. 2 is a block diagram showing the configuration of STB, FIG. 3 is a block diagram showing a configuration of an example of a controller, and FIG. 4 is a sequence chart of the electronic apparatus control system. FIG. 5 is a block diagram showing another configuration example of the electronic apparatus control system, and FIG. 14 is a block diagram showing one configuration example of a television monitor.

As shown in FIG. 1, at first, the configuration example of the electronic apparatus control system in this embodiment is provided with: a controller 11; electronic apparatuses, for example, such as a DVD recording/reproducing unit 13, an HDD recording/reproducing unit 14 and a television monitor 15; information receivers such as an STB 16 and an antenna 17; a network 18 through which the respective units are connected to each other; and a management center 19 for managing a license information. Also, the controller 11 and the management center 19 are connected through a wired or wireless telephone line 20. On the other hand, the controller 11 is connected through a wireless unit 21 to the DVD recording/reproducing unit 13, the HDD recording/reproducing unit 14, the television monitor 15 and the STB 16.

The controller 11, which has a function of a portable telephone, is connected through the telephone line 20 to the management center 19, and it obtains from the management center 19 the license information with regard to the network 18 controlled by the controller 11. The information is stored in a memory 51M in a CPU 51 disposed at the controller 11 (see FIG. 3). The management center 19 is intended to manage a copyright with regard to content information such as a picture, a program and the like, and manages and applies various information associated with it. For example, with regard to a fact that a certain music information flows through the network 18, it may be considered that the management center 19 manages the number of the electronic apparatuses that can use the music information, the usable period, the allowance of a duplication, the number of the duplications and the like, and has a function of collecting a fee based on an allowed license condition.

In accordance with the license condition obtained from the management center 19, the controller 11 controls the electronic apparatuses connected to the network 18. The controller 11 transmits a control signal through the wireless unit 21 to the respective electronic apparatuses. As the wireless unit 21, it is possible to use a unit using an infrared ray, or an electric wave communicating portion proposed as a Bluetooth standard used in a short distance communication at a weak output, or the like.

As the electronic apparatuses connected to the network 18, there are the DVD recording/reproducing unit 13, the HDD recording/reproducing unit 14, the television monitor 15, the STB 16 and the like. Usually, the picture information or the like received by the STB 16 through the antenna 17 is recorded or reproduced in its original state by the DVD recording/reproducing unit 13 or the HDD recording/reproducing unit 14. The television monitor 15 reproduces and displays the picture information received by the STB 16, or the picture information recorded by the DVD recording/reproducing unit 13 or the HDD recording/reproducing unit 14.

Here, typically, the copyright may be sometimes considered in the case when the content information is transmitted and received through the above-mentioned network. However, the technical unit for preventing a copy prepared in a certain home from being reproduced in a different home is not configured.

On the contrary, the system according to the present invention is intended to introduce the controller 11 and the encrypting method in relation to it and thereby protect the copyright. For example, the controller 11 generates a group key peculiar to the network 18 and supplies the group key to the electronic apparatuses connected to the network 18. In the network 18, it is assumed that a predetermined range, for example, one home area is defined as one network unit and the home areas individually exist in each home. At this time, as the license condition, for example, there are the limit on the number of the electronic apparatuses to which the group key can be supplied, namely, the limit on the times of the transmissions of the group key from the controller 11, and the like. If there are many electronic apparatuses having the same group key, the network 18 is finally expanded, which disables the protection of the copyright.

The group key is intended to encrypt the information flowing through the network 18 in accordance with it and then decode the obtained information. Each electronic apparatus has an encrypting/decoding device. Thus, the content information flowing through the network 18 is the content information encrypted using the group key (the information that does not require the protection of the copyright is kept in a modulation manner common to the electronic apparatuses), and the electronic apparatus without the group key cannot capture the information as the visual and viewable information. Also, if the network connection is established in accordance with an IEEE 1394 standard, the encrypted content information may be designed so as to be multi-encrypted in accordance with a different key that is changed for each connection, further in accordance with DTCP (Digital Transmission Licensing Administrator).

Thus, even if the information is escaped from the network 18, an electronic apparatus connected to a different network cannot capture it as the visual and viewable information. Hence, the copyright is protected.

There are various methods as the method for determining the group key of the network 18. However, in order to avoid the existence of the same group key, it is easy and effective to generate the group key by using a telephone number peculiar to a portable telephone as a base.

Next, as shown in FIG. 2 for example, the STB 16 includes a front end portion 31, a descrambler 32, an extracting portion 33, an encrypting portion 34, an interface portion 35, a bus 36, a CPU 37, a key 38, a displaying portion 39, a communicating portion 40 and an antenna 41. The information such as a picture and the like is shaped as a signal by the front end portion 31. The scrambled information is decoded by the descrambler 32, and the picture information is extracted by the extracting portion 33. Moreover, the encrypting portion 34 encrypts the picture information in accordance with a given group key, and transmits through the interface portion 35 and the bus 36 to the CPU 37. Also, the above-mentioned units are controlled through the bus 36 by the CPU 37. The key 38 to input an operation input and the displaying portion 39 for displaying information with regard to the process and the operation are further connected to the CPU 37. The communicating portion 40 carries out a mutual authentication together with a communicating portion 54 (which will be described later) of the controller 11, and receives the control information transmitted through the antenna 41 from the controller 11, for example, a group key and, enters into the memory 37 of the CPU 37. The CPU 37 indicates the encrypting portion 34 to encrypt the information using the group key.

Next, as shown in FIG. 14 for example, the television monitor 15 includes an interface portion 100, a decoding portion 101, a signal portion 102, a display driving portion 103, a displaying portion 104 such as a CRT (Braun tube), PDP, a liquid crystal and the like, a bus 105, a CPU 106, a key 107, a displaying portion 108, a communicating portion 109 and an antenna 110. A digital picture information received from the interface portion 100 is decoded by the decoding portion 101 by using the group key, and displayed on the displaying portion 108 through the signal portion 102 and the display driving portion 103. The communicating portion 109 carries out a mutual authentication together with the communicating portion 54 of the controller 11 (see FIG. 3), and receives the group key transmitted from the controller 11 through the antenna, and stores it in the memory 106M of the CPU 106. The CPU 106 indicates the decoding portion to decode the digital picture information using the group key.

Next, as shown in FIG. 3 for example, the controller 11 includes a CPU 51, a key 52, a displaying portion 53, the communicating portion 54 and an antenna 55. Incidentally, the functional units of a portable telephone are omitted. The license information with regard to a group key obtained from the management center 19 by a unit (not shown) is judged by the CPU 51, and transmitted through the communicating portion 54 and the antenna 55 to each electronic apparatus for which the mutual authentication is set. For example, let us suppose that the license information is the number of the transmissions of the group key. The CPU 51 counts the number of the transmissions, and carries out the control so that the transmission of the group key is stopped when the transmission number becomes equal to a predetermined number. That is, the transmission number implies the number of the electronic apparatuses having the group key that are connected to the network. Also, the key 52 is intended to input the operation indication, and the displaying portion 53 displays various operation information.

By the way, the controller 11 may be designed to contain a slot constituting an example of an inserting unit, in which a memory card 12 can be freely attached and detached as shown in FIG. 1. In this case, it is possible to obtain the memory card 12 recording the license information from the management center, and insert into a connector of the memory card of the controller 11, and then provide for the control of the electronic apparatus. In this case, it is not necessary to establish the telephone line connection to the management center 19 or write the license information to the memory card 12.

The flow of the authentication procedure will be described below with reference to the sequence chart of FIG. 4. This sequence chart shows the mutual operational relation between the controller, the management center and the electronic apparatus along with the temporal flow, and the longitudinal direction represents the temporal elapse.

In FIG. 4, at first, by using a telephone function of the controller 11, it is connected to the management center 19 (Step S101), and the authentication procedure is started (Step S102, Step S103). Next, the controller 11 applies for a license (Step S104), and the management center 19 starts an issuing procedure (Step S105). If the condition of the license is the number of the electronic apparatuses connected to the network, the number is sent as the license information from the management center 19, and loaded into a memory 11M in the controller 11. Then, the line is cut off (Step S106).

Next, the controller 11 generates a group key with regard to the network on the basis of the telephone number (Step S107), and judges whether or not it can be transferred to the electronic apparatus (Step S108). If it cannot be transferred, the authentication procedure is stopped. If it can be transferred, the authentication procedure is continued between the controller 11 and the electronic apparatus, and a session key is generated (Step S109, Step S110). The group key is encrypted in accordance with the encrypted session key (Step S111). The encrypted group key is transmitted to the electronic apparatus (Step S112). Then, the electronic apparatus loads the received group key (Step S113). When receiving the completion of the loading, the controller 11 subtracts 1 from a recorded license number (Step S114). The operational flow returns back to the step S108. Moreover, whether or not the transfer can be done is judged. Here, if the remaining license number is 0, this implies that the number of the transferred group keys becomes equal to the allowed number, and the authentication procedure is completed. If it is not still 0, the authentication procedure from the step S109 to the step S114 is again carried out.

Another configuration example of the electronic apparatus control system in this embodiment will be described below with reference to FIG. 5. Incidentally, the similar reference symbols are given to the members similar to those shown in FIG. 1, and their explanations are omitted.

As shown in FIG. 5, another configuration example of the electronic apparatus control system is provided with: a controller 23; the memory card 12 inserted into the controller 23; the electronic apparatuses, for example, such as the DVD recording/reproducing unit 13 and the television monitor 15; the information receivers such as the STB 16 and the antenna 17; the network 18 to connect the respective units; and the management center 19 for managing the license information. Also, the controller 23 is connected to the DVD recording/reproducing unit 13, the television monitor 15 and the STB 16 through an optical space communication (i.e., an optical wireless-communication) 22. An optical transmitting/receiving unit 24 is assembled in each of the controller 23, the DVD recording/reproducing unit 13, the television monitor 15 and the STB 16.

The controller 23 has a function of a remote control for, for example, operating the electronic apparatus. The memory card 12 recording the license information is inserted into a connector (not shown). The memory card 12 can be freely attached to and detached from this connector, and it can be held while separated from the controller 23.

The license information with regard to the network 18 controlled by the controller 23 is obtained by a predetermined method of, for example, connecting a personal computer to the management center 19 and loading to the memory card 12. Or, if there is not a proper unit for loading to the memory card 12 through the communication line, it may be considered that the management center 19 loads to the memory card 12 and sends.

In accordance with the license condition obtained from the management center 19, the controller 23 controls the electronic apparatus connected to the network 18. A signal from the controller 23 is transmitted through the optical space communication 22 to the respective electronic apparatuses. The transmission/reception of the signal is carried out by the optical transmitting/receiving units 24 placed in the electronic apparatuses, such as the DVD recording/reproducing unit 13, the television monitor 15, the STB 16 and the like.

The system having this remote control function is different from the above-mentioned system having the portable telephone function in that the controller 23 uses the function of the remote control unit of the electronic apparatus and that the transmission of the control information between the controller 23 and the electronic apparatus is done by using the optical space communication 22 assembled as the remote control function. The other configurations, operations and actions in the electronic apparatus control system shown in FIG. 5 are substantially equal to those described with reference to FIG. 4. Thus, their second explanations are omitted.

According to the electronic apparatus control system described with reference to FIGS. 1 to 5, the secrecy of the information flowing through the network, namely, the protection of the copyright of the information is strictly reserved for the electronic apparatuses outside the group of the network. However, there is a request that the electronic apparatus outside the group can treat the encrypted information under a certain limitation.

Thus, the method in which the electronic apparatus outside the group can treat the information encrypted by the above-mentioned operations under the certain limitation, and the electronic apparatus and the system which use that method will be described below with reference to FIGS. 6 to 13. Here, FIGS. 6, 7 are the configuration examples of the electronic apparatus, respectively, and FIGS. 8 to 13 are the flowcharts showing the flows of the operations.

Figure 6:
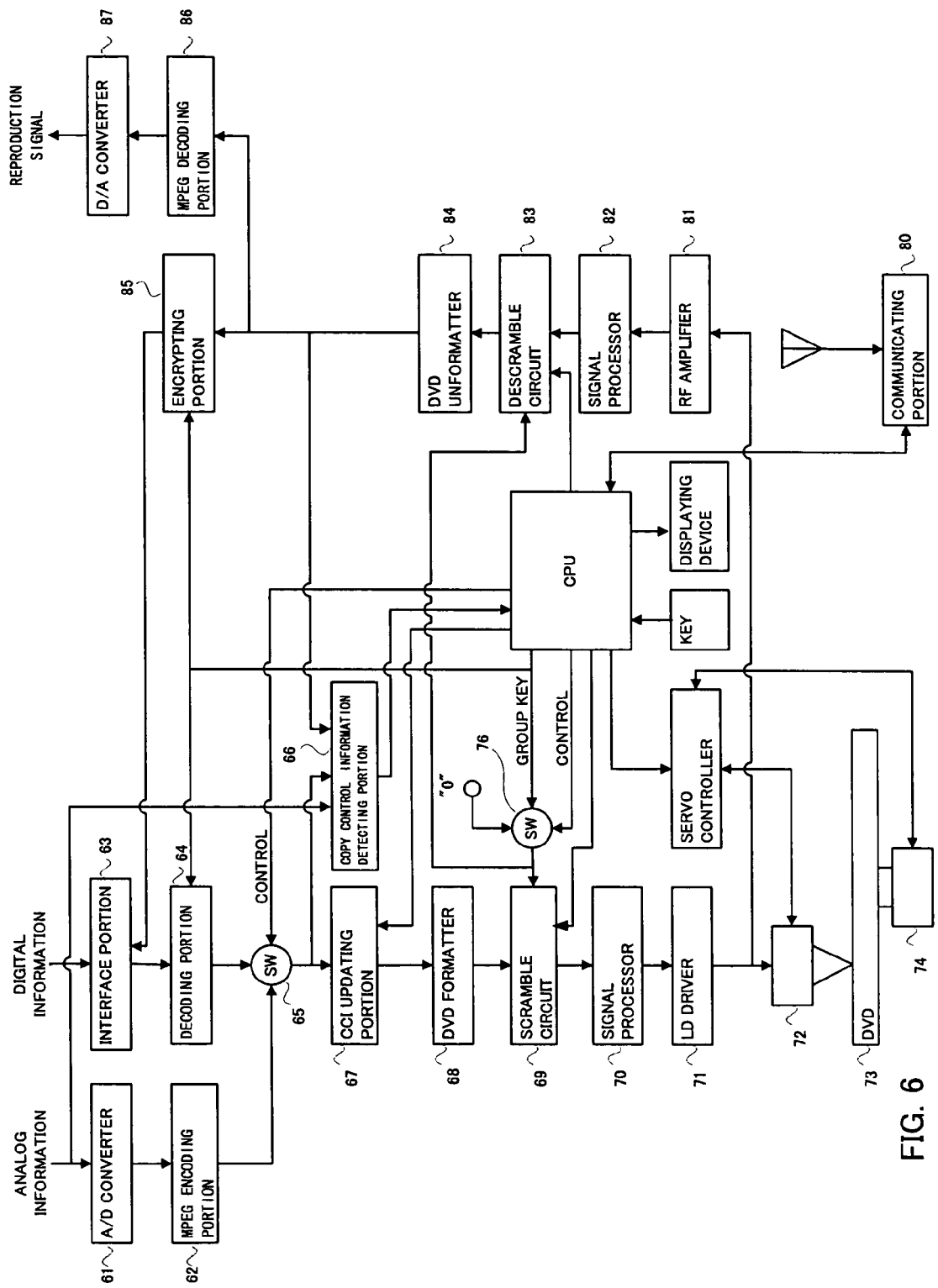
FIG. 6 is a block diagram showing one configuration example of an electronic apparatus according to this embodiment.
Figure 7:
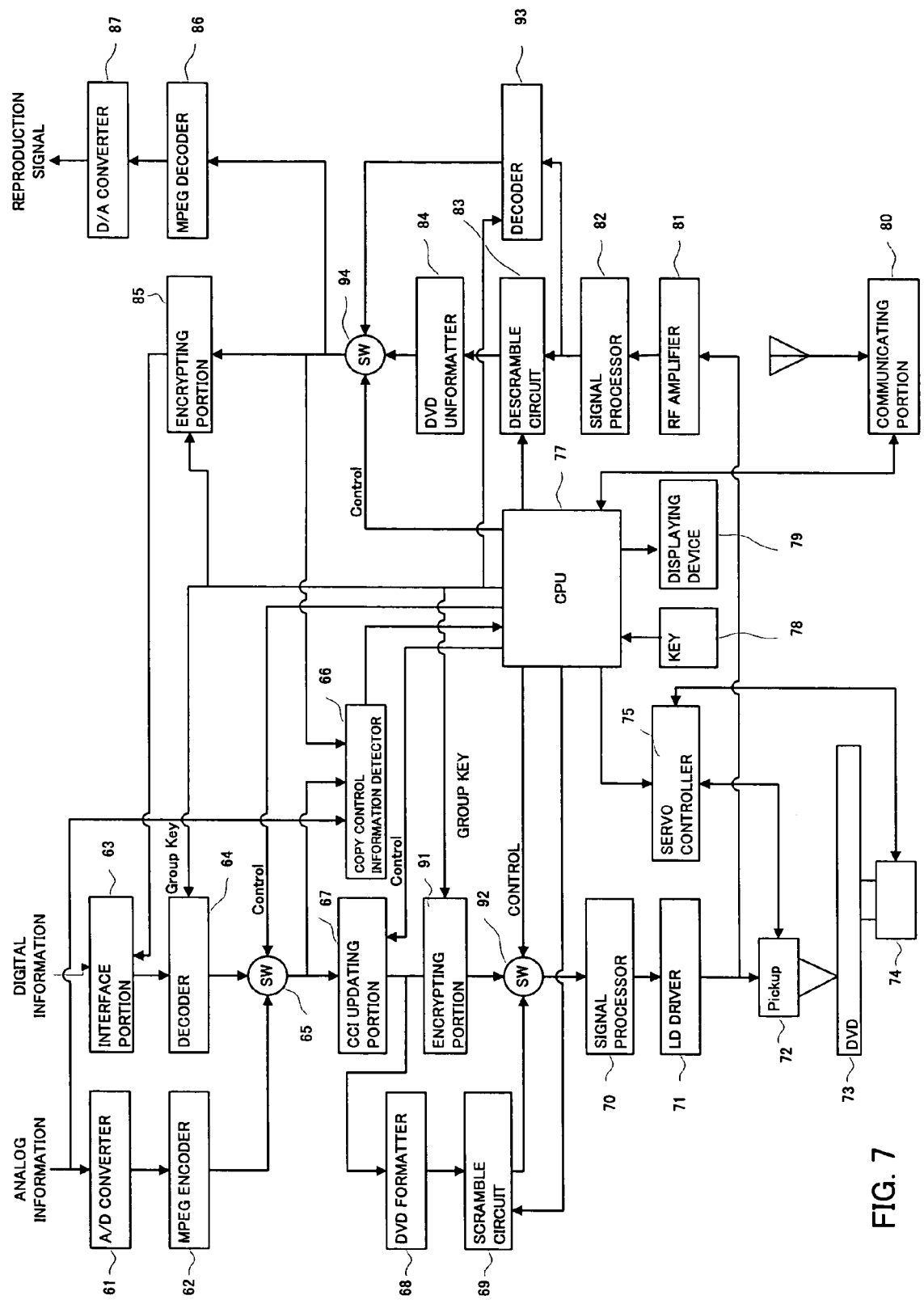
FIG. 7 is a block diagram showing another configuration example of an electronic apparatus according to this embodiment.

FIG. 6 is a circuit block diagram showing an example of a DVD recorder. This DVD recorder is provided with: an A/D converter 61 for capturing an analog information; an MPEG encoding portion 62 for encoding a digitized analog information as MPEG; an interface portion 63 for capturing a digital information; a decoding portion 64 for decoding the digital information; a switch SW 65 for selecting the information; a copy control information detecting portion 66 for detecting a copy control information from the analog information and the digital information; a CCI updating portion 67 for changing CCI; a DVD formatter 68 for converting into a DVD signal; a scramble circuit 69 for scrambling the data converted into the DVD signal; a signal processor 70 for converting into a recording signal; an LD driver 71 for driving a semiconductor laser to record; a pickup 72 for recording with a modulated laser light; a DVD disc 73; a rotation driver 74 of the DVD disc 73; a servo controller 75 for controlling the pickup 72 and the rotation driver 74; a switch SW 76 for selecting whether the encryption is done on the basis of an inter-group common format or the group key; a CPU 77 for controlling the entire apparatus; a key 78 for operating the apparatus; a displaying device 79 for displaying various information; a communicating portion 80 for receiving the information with regard to the group key and the like; an RF amplifier 81 for amplifying and processing a pickup signal of the pickup 72; a signal processor 82 for processing an output signal from the RF amplifier 81; a descramble circuit 83 for descrambling the signal processed by the signal processor 82; a DVD unformatter 84 for unformatting the descrambled DVD signal; an encrypting portion 85 for encrypting the unformatted DVD signal using the group key; an MPEG decoding portion 86 for decoding the unformatted DVD signal as MPEG; and a D/A converter 87 for converting the MPEG-decoded digital signal into the analog signal. A DVD reproduction signal is outputted from the D/A converter and displayed on a monitor and the like.

The circuit operation in the DVD recorder shown in FIG. 6 will be described below.

At first, with regard to the recording operation, if an analog input is selected, it is digitized by the A/D converter 61, and converted into the MPEG format by the MPEG encoding portion 62. Also, it is inputted to the copy control information detecting portion 66 in order to know the copy control of the analog information. The CPU 77 controls the switch SW 65 so as to select the analog information, and its output is introduced into the next CCI updating portion 67 and the like.

Next, it is converted into the DVD signal by the DVD formatter 68. Then, as necessary, it is scrambled by the scramble circuit 69 and encrypted. At this time, since the CPU 77 knows that data currently under processing relates to analog information, the CPU 77 turns the switch SW 76 to the side [0], and it is scrambled on the basis of the common format over groups. Then, it is written to the DVD disc after the signal process. Thus, the analog information copied on the basis of the common format over groups as mentioned above can be reproduced without any limit on the group. By the way, if the CCI is CF (Copy Free), the scrambling operation is not carried out.

On the other hand, if a digital input is selected, the digital information is inputted from the interface portion 63 to the decoding portion 64. The decoding portion 64 decodes it using the group key supplied from the CPU 77. The decoded data is selected by the switch SW 65 and introduced into the CCI updating portion 67. Also, it is inputted to the copy control information detecting portion 66 in order to know the copy control of the digital information. In accordance with the information from the copy control information detecting portion 66, in the CPU 77, the CCI updating portion 67 updates the CCI (Copy Control Information) state. For example, if the signal is CO (Copy Once), it is rewritten to "No More Copy" and the like.

Next, it is converted into the DVD signal by the DVD formatter 68, and scrambled by the scramble circuit 69 and encrypted. At this time, if CCI of the data currently being processed is CO and an out-of-group Move is NG, the CPU 77 connects the switch SW 76 to the input side of the group key, and encrypts by adding the group key peculiar to the group to a part of the key. Then, it is written to the DVD disc after the signal process. Thus, since it is encrypted while it includes the group key peculiar to the group, it can be reproduced only by the electronic apparatus connected to the network group. Hence, it is possible to protect the secrecy of the information or the copyright.

On the other hand, if CCI is CO and the out-of-group Move is OK, the CPU 77 turns the switch SW 76 to the side [0], and it is scrambled on the basis of the common format over groups.

The reproduction will be described below. The RF signal reproduced by the pickup 72 is inputted through the RF amplifier 81 and the signal processor 82 to the descramble circuit 83, and the encryption is released. If it is scrambled using the group key, the group key is supplied from the CPU 77. If it is scrambled on the basis of the common format, its release key is supplied.

The data, in which the scrambling is released, is returned back to the MPEG signal by the DVD unformatter 84, and decoded as the MPEG by the MPEG decoding portion 86, and converted into a reproduction signal by the D/A converter 87, and displayed on the monitor and the like. On the other hand, it is also inputted to the encrypting portion 85, and encrypted using the group key, and outputted through the interface 63 to an external portion. Then, it flows through the network.

Another configuration example of the DVD recorder in this embodiment will be described below with reference to FIG. 7. Incidentally, in FIG. 7, the similar reference symbols are given to the members similar to those shown in FIG. 6, and their explanations are omitted In FIG. 7, another configuration example of the DVD recorder is different from the configuration example shown in FIG. 6 in the following points. That is, the flow of the input analog information is equal, and the format of the digital information is not again converted in the case that the digital information is encrypted using the group key. Then, as its original data, it is encrypted using the group key at an encrypting portion 91, and the encryption based on the group key and the scramble common in the group are selected by a switch SW 92. Also, as for a signal reproduced from the disc, the data converted on the basis of the common format is transmitted through the same route, and the data encrypted using the group key is decoded using the group key by a decoding portion 93. Also, the two data are inputted to a circuit block at a later stage after the selection of a switch SW 94.

The circuit operation in the DVD recorder shown in FIG. 7 will be described below.

At first, with regard to the recording operation, if the analog input is selected, it is digitized by the A/D converter 61, and converted into the MPEG format by the MPEG encoding portion 62. Also, it is inputted to the copy control information detecting portion 66 in order to know the copy information of the analog information. The CPU 77 carries out a control so that the switch SW 65 is connected to the analog side. Then, it is introduced into the CCI updating portion 67, the DVD formatter 68, the scramble circuit 69 and the switch SW 92.

In the scramble circuit 69, if CCI is CO, it is scrambled on the basis of the common format over groups. Incidentally, if CCI is CF, it is not scrambled.

On the other hand, if the digital input is selected, it is inputted from the interface portion 63 to the decoding portion 64. The decoding portion 64 decodes it using the group key supplied from the CPU 77. The decoded data is selected by the switch SW 65, and introduced into the CCI updating portion 67. Also, it is inputted to the copy control information detecting portion 66 in order to know the copy control of the digital information. In accordance with the information from the copy control information detecting portion 66, in the CPU 77, the CCI updating portion 67 updates the CCI state.

If CCI is CO and the out-of-group Move is NG, the digital information is directly inputted to the encrypting portion 91, and encrypted using the group key. After that, it is written to the DVD disc by the pickup 72 through the signal processor 70 and the LD driver 71.

On the other hand, if CCI is CO and the out-of-group Move is OK, the digital information is scrambled in which the scrambling manner is common over groups under the DVD format, and it is written to the DVD disc.

The reproduction will be described below. The RF signal reproduced by the pickup 72 is inputted through the RF amplifier 81 and the signal processor 82 to the descramble circuit 83 in the case of the encryption based on the common format over groups or to the decoding portion 93 in the case of the encryption based on the peculiar group key, and the encryption is released. The signal released by the descramble circuit 83 is further converted into the DVD signal by the DVD unformatter 84, and selected by the switch SW 94. Also, the signal decoded by the decoding portion 93 is not converted into the DVD signal by the DVD formatter 68 at the time of the recording. Thus, it is inputted in its original state to the switch SW 94 and selected.

The data after the scrambling is released is returned back to the MPEG signal by the DVD unformatter 84, and decoded as the MPEG by the MPEG decoding portion 86, and converted into the reproduction signal by the D/A converter 87, and displayed on the monitor and the like. On the other hand, it is also inputted to the encrypting portion 85, and encrypted using the group key, and outputted through the interface 63 to the external portion. Then, it flows through the network.

In addition, the operation in the DVD recorder shown in FIG. 7 and the effect resulting from the operation and the like are similar to those described with reference to FIG. 6.

The flow of the signal process with regard to the copy control of the DVD recorder described with reference to FIGS. 6 and 7 will be described below.

Figure 8:
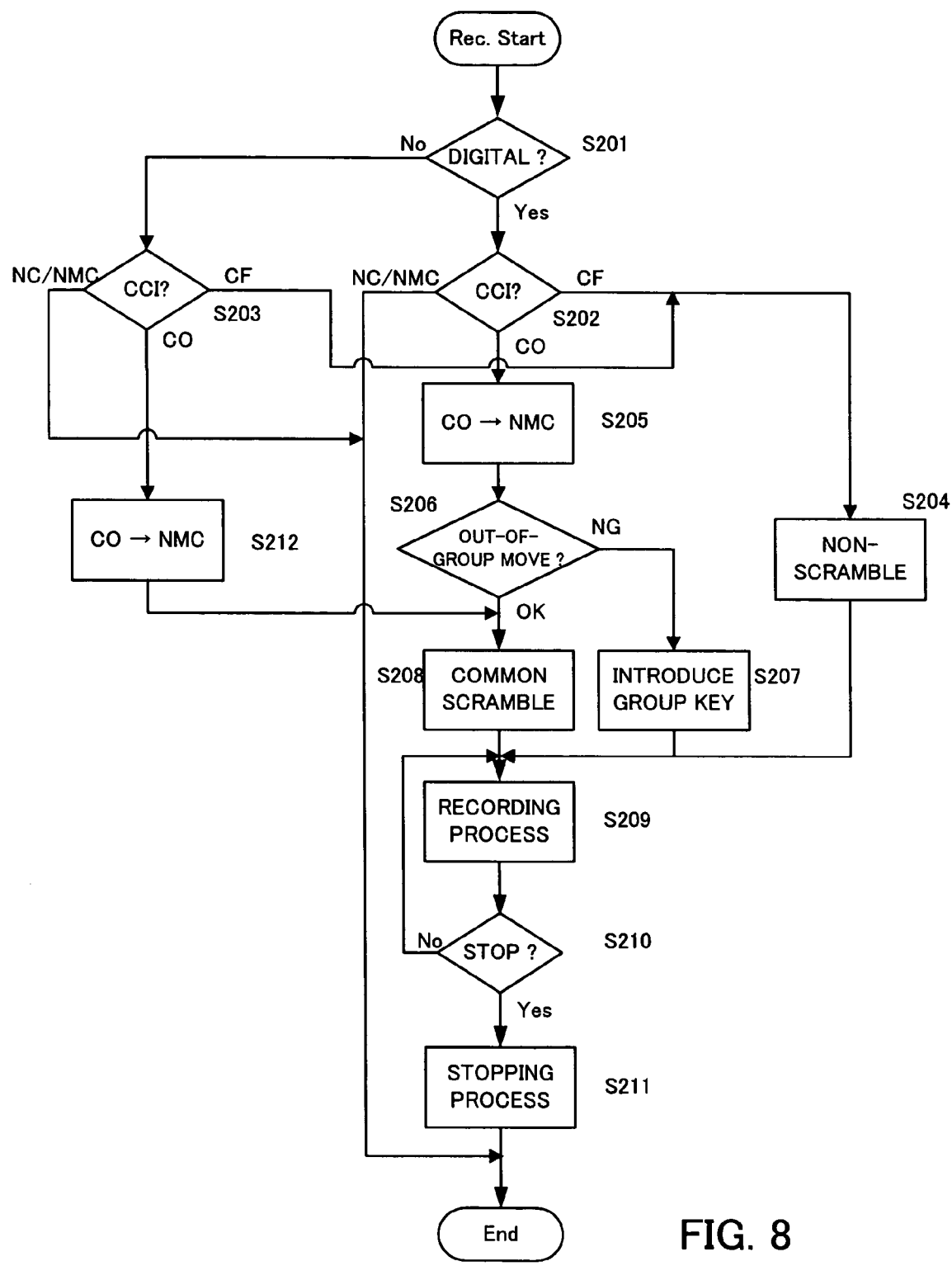
FIG. 8 is a flowchart showing a flow of a recording operation in an electronic apparatus control system in this embodiment.

As shown in FIG. 8, at first, as for the recording, whether the information to be recorded is the analog information or the digital information is judged (Step S201). If it is the digital information (Step S201: YES), whether the CCI (Copy Control Information) state is CF (Copy Free) or CO (Copy Once) or NC/NMC (Never Copy/No More Copy) is judged (Step S202).

If it is CF at the step S202, the copy is free. Thus, at the time of the recording, the encrypting is not required, and the scrambling is not done (Step S204), and the recording process is done (Step S209). In succession, whether or not the recording process is stopped is judged (Step S210). If it is not stopped, the recording process is continued. If it is stopped, the stopping process is done (Step S211), and the operation is ended.

If it is NC/NMC at the step S202, the copy is inhibited. Thus, the recording operation is not done, and the operation is ended.

If it is CO at the step S202, the copy can be done only once, and the CCI state is set from CO to NMC (Step S205). Next, whether or not the out-of-group Move is allowed is judged (Step S206). If the out-of-group Move is not allowed, the group key is introduced to then carry out the encryption (Step S207), and the recording process is done (Step S209). On the other hand, if the out-of-group Move is allowed, the common scrambling is applied (Step S208), and the recording process is done (Step S209). Incidentally, "out-of-group Move" implies that the information is moved to a different recording medium, namely, a different network group in this case, and this is the type of the copy removed from the original recording medium.

After that, whether or not the recording process is stopped in succession is judged (Step S210). If it is not stopped, the recording process is continued. If it is stopped, the stopping process is done (Step S211), and the operation is stopped.

Also, if it is judged as the analog signal at the step S201 (Step S201: NO), whether the CCI state is CF or CO or NC/NMC is judged (Step S203) similarly to the case of the digital signal. If it is CF, the encrypting is not required at the time of the recording, and the scrambling is not done (Step S204), and the recording process is done (Step S209). Also, if it is NC/NMC, the recording operation is not done, and the operation is ended. Moreover, if it is CO, this is the copy that can be done only once. In the case of the analog signal, the judgment of the out-of-group Move cannot be done. Therefore, it is always assumed as allowed, and the CCI state is changed from CO to NMC at the step S212. Then, the operational flow proceeds to the step S208.

Figure 9:
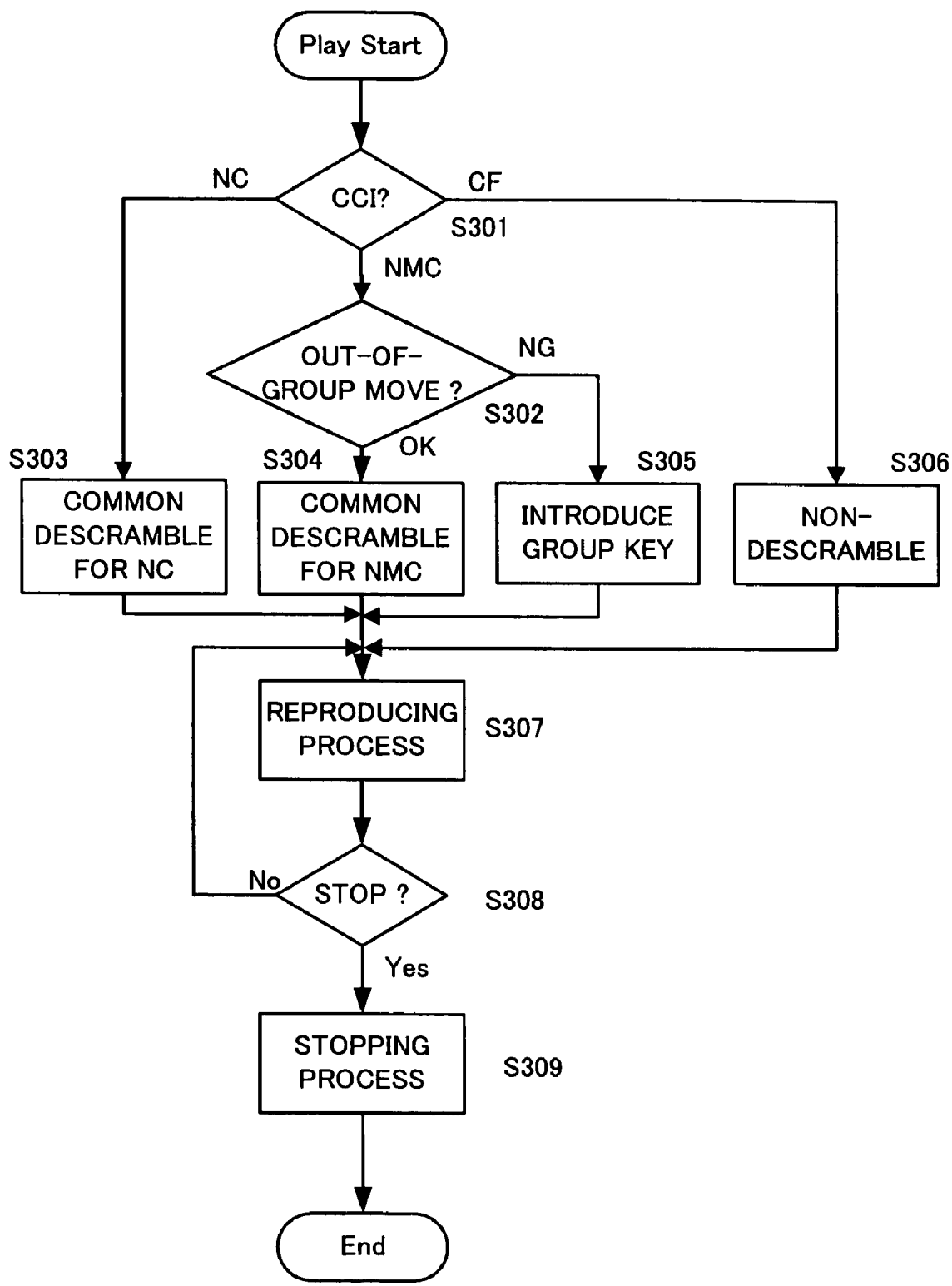
FIG. 9 is a flowchart showing a flow of a reproducing operation in an electronic apparatus control system in this embodiment.

Next, as shown in FIG. 9, as for the flow of the reproduction, whether the CCI state is CF or NC or NMC is firstly judged (Step S301).

If it is CF, the copy is free, and the information is not scrambled. Thus, the operation for releasing the scrambling is not required (Step S306), and the operational flow directly proceeds to the reproducing process (Step S307). In succession, whether or not the reproducing process is stopped is judged (Step S308). If it is not stopped, the reproducing process is continued. If it is stopped, the stopping process is done (Step S309), and the operation is ended.

If it is NC at the step S301, the scrambling is released by the common descrambling for NC (Step S303). After that, the operational flow proceeds to the reproducing process (Step S307). Whether or not the reproducing process is stopped is judged (Step S308). If it is not stopped, the reproducing process is continued (Step S309), and the operation is ended.

If it is NMC at the step S301, whether or not the out-of-group Move is allowed is judged (Step S302). If the out-ofgroup Move is not allowed (Step S302: NG), the encryption is done using the group key. Then, the group key is introduced to then carry out the decoding (Step S305). On the other hand, if the out-of-group Move is allowed (Step S302: OK), the common descrambling for NMC is released (Step S304). After that, the operational flow proceeds to the reproducing process (Step S307). In succession, whether or not the reproducing process is stopped is judged (Step S308). If it is not stopped, the reproducing process is continued. If it is stopped, the stopping process is done (Step S309), and the operation is ended.

Figure 10:
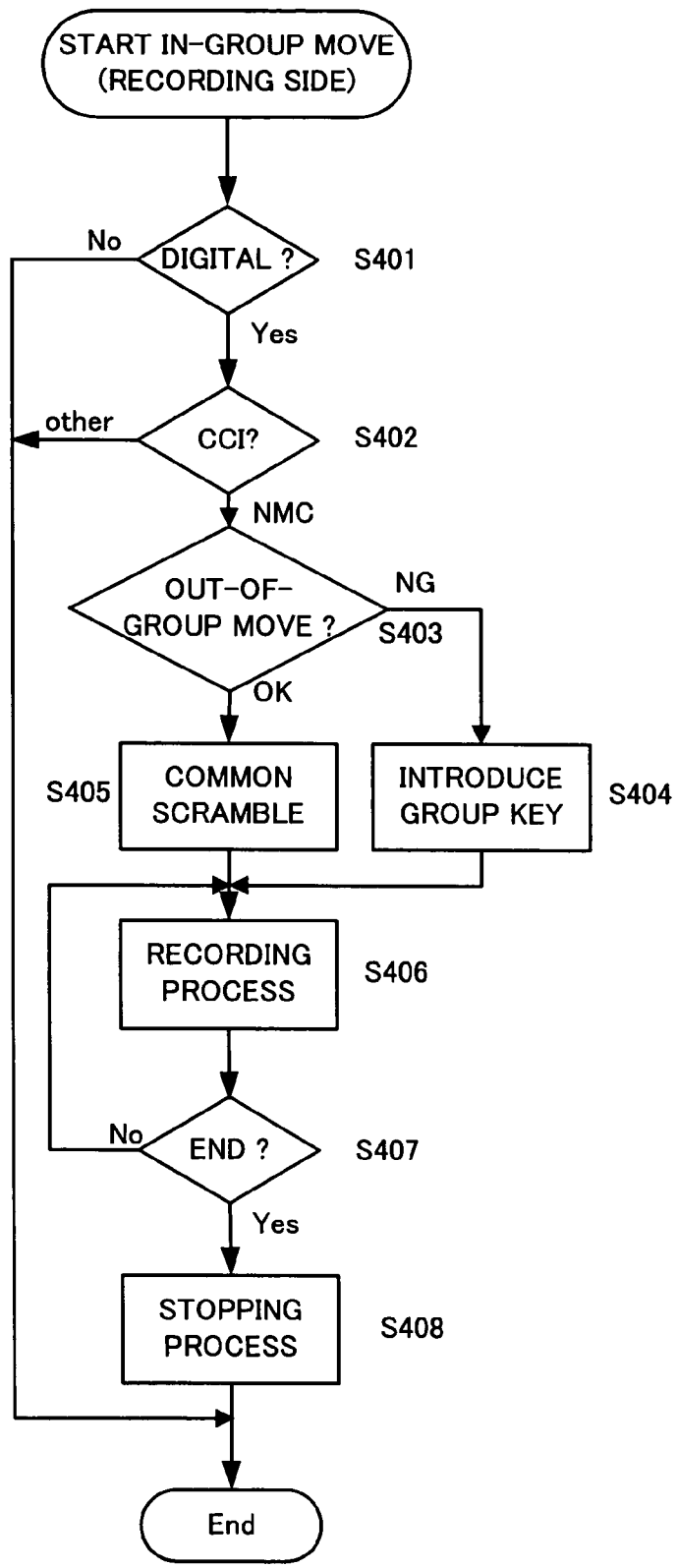
FIG. 10 is a flowchart showing a flow of an in-group Move recording operation, in an electronic apparatus control system in this embodiment.

Next, with reference to FIG. 10, the flow of the recording side of an in-group Move will be explained. Incidentally, the "in-group Move" means that transferring information from one record medium to another record medium in the same network group, and it is a type of copying in that the information is deleted from the original record medium.

Firstly, it is judged whether information to be recorded is a digital signal or an analog signal (Step S401). If it is the analog signal (Step S401: NO), there is not the in-group Move in an analog interface. Thus, the operation of the in-group Move is not done. Then, the operation is ended.

On the other hand, if it is the digital signal (Step S401: YES), the CCI state is judged (Step S402). If it is the state except NMC, there is no operation mode corresponding to the in-group Move. Thus, the operation of the in-group Move is not carried out, and the operation is ended. On the other hand, if it is NMC, whether or not the out-of-group Move can be allowed is judged (Step S403).

Here, if the out-of-group Move is not allowed (Step S403: NG), at the time of the recording, an encryption for each group is carried out. Then, the group key is introduced to then carry out the encryption (Step S404), and the recording process is done (Step S406). On the other hand, if the out-of-group Move is allowed (Step S403: OK), it is common over groups. Thus, the common scrambling is applied (Step S405). Then, the recording process is done (Step S406).

After that, whether or not the recording process is ended is judged (Step S407). If the recording process is not still ended, it is continued until the end of the recording process. When it is ended, the stopping process is done (Step S408), and the series of recording processes is ended. Incidentally, the information targeted for the in-group Move on the reproducing side is erased at the time of the completion of the in-group Move.

Figure 11:
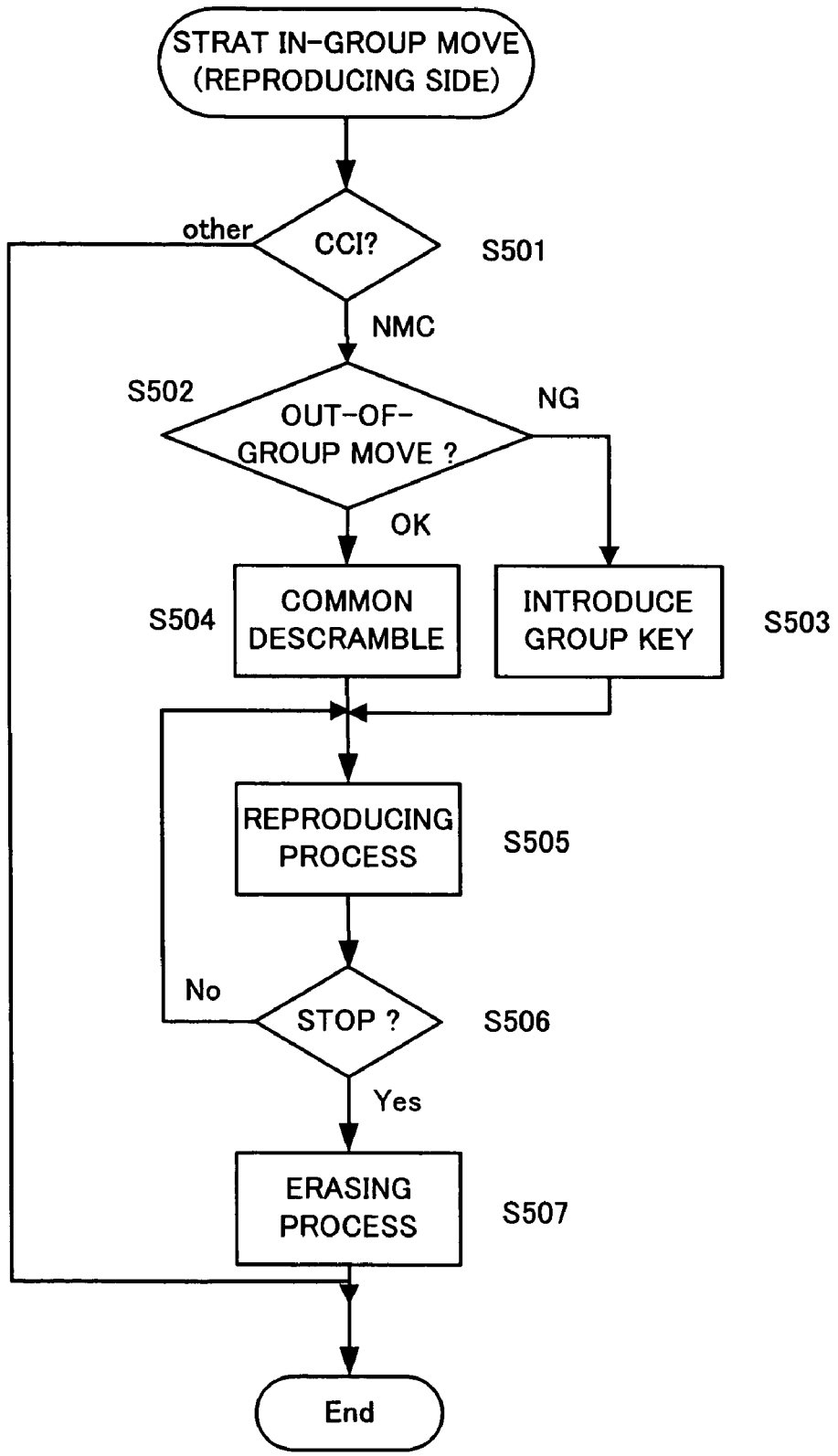
FIG. 11 is a flowchart showing a flow of an in-group Move reproducing operation, in an electronic apparatus control system in this embodiment.

Next, as shown in FIG. 11, as for the flow on the reproducing side of the in-group Move, the CCI state is firstly judged (Step S501). If it is the state except NMC, there is no operation mode corresponding to the in-group Move. Thus, the operation of the in-group Move is not carried out, and the operation is ended. On the other hand, if it is NMC, whether or not the out-of-group Move can be allowed is judged (Step S502).

Here, if the out-of-group Move is not allowed (Step S502: NG), at the time of the recording, the encryption for each group is carried out. Then, the group key is introduced to then carry out the decoding (Step S503). On the other hand, if the out-of-group Move is allowed (Step S502: OK), it is common over groups. Thus, the common scrambling is applied, and the decoding is done (Step S504).

After that, the reproducing process is done (Step S505). Whether or not the reproducing process is stopped is judged (Step S506). The reproducing process is done until the stop. After the stop, the original record information is erased (Step S507), and the series of reproducing processes is ended.

By the way, the reproducing process and the erasing process may be alternately repeated for each short unit.

Furthermore, in the case of the in-group Move from one DVD to another DVD, a direct recording is possible without a decoding on the reproducing side and an encrypting on the recording side, since the DVD on the recording side performs the same encryption processing as the original DVD.

Figure 12:
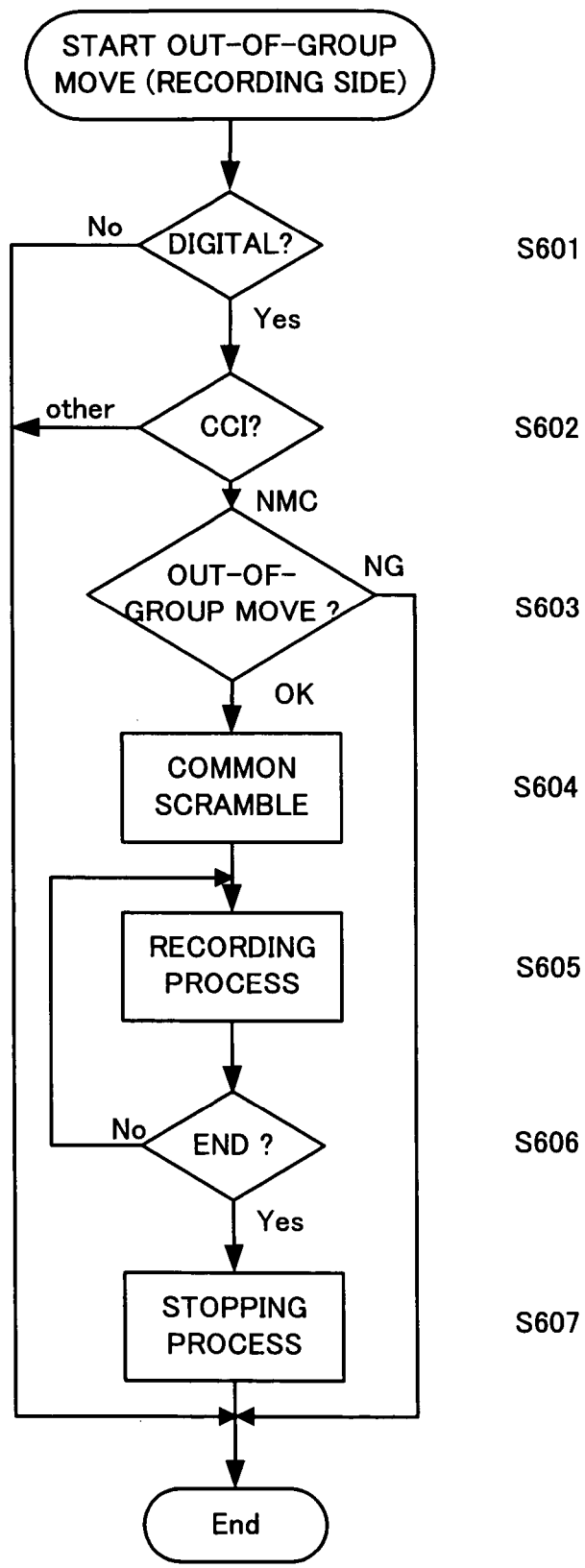
FIG. 12 is a flowchart showing a flow of an out-of-group Move recording operation, in an electronic apparatus control system in this embodiment.

Next, as shown in FIG. 12, as for the flow on the recording side of the out-of-group Move, it is firstly judged whether information to be recorded is a digital signal or an analog signal (Step S601). If it is the analog signal, there is not the mode of the in-group Move in the analog interface. Thus, the operation of the in-group Move is not done, and the operation is ended.

If it is the digital signal (Step S601: YES), the CCI state is firstly judged (Step S602). If it is the state except NMC, there is no operation mode corresponding to the out-of-group Move. Thus, the operation of the out-of-group Move is not carried out. On the other hand, if it is NMC, whether or not the out-of-group Move can be allowed is judged (Step S603).

Here, if the out-of-group Move is not allowed (Step S603 NG), the out-of-group Move cannot be done. Thus, the operation is ended.

On the other hand, if the out-of-group Move is allowed (Step S603: OK), the common scrambling to a different group is applied (Step S604), and the recording process is done (Step S605). After that, whether or not the recording process is ended is judged (Step S606). If the recording process is not still ended, the recording process is continued until the end. At the time of the end, the stopping process is done (Step S607). The series of recording processes is ended. Incidentally, the information targeted for the out-of-group Move on the reproducing side is erased at the time of the completion of the out-of-group Move.

Figure 13:
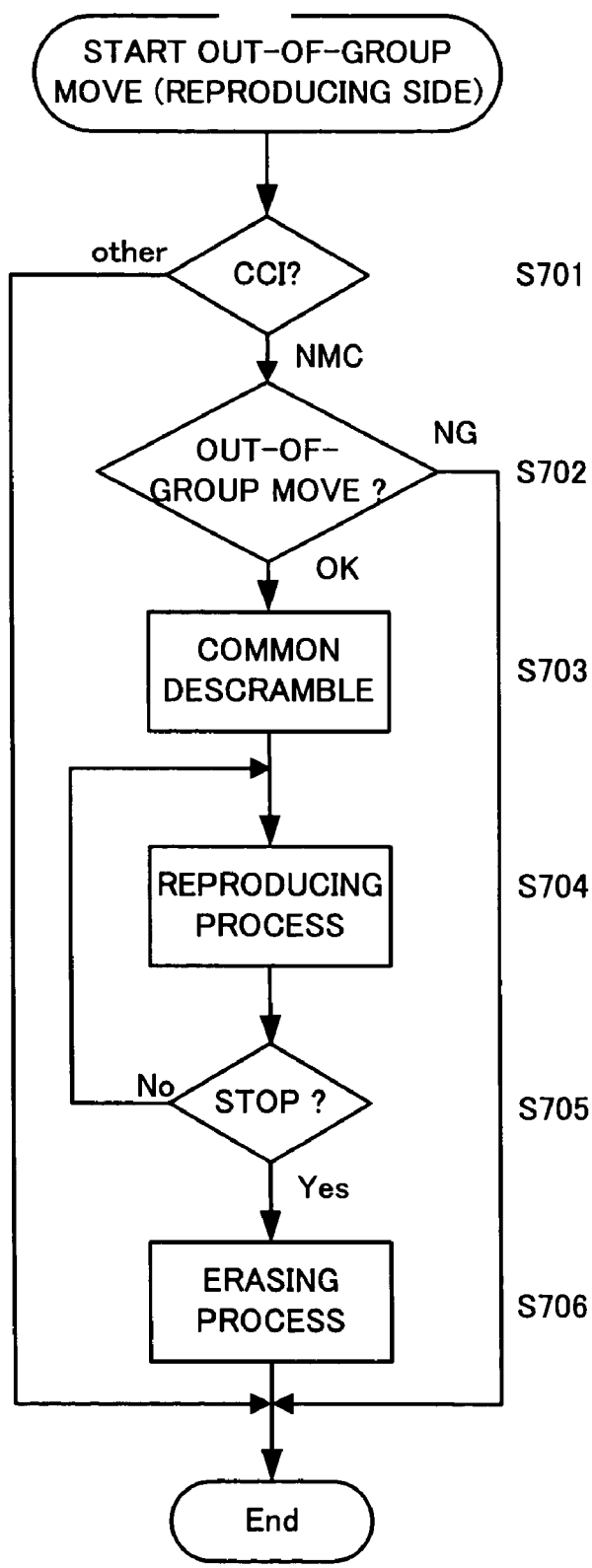
FIG. 13 is a flowchart showing a flow of an out-of-group Move reproducing operation, in an electronic apparatus control system in this embodiment.

Next, as shown in FIG. 13, as for the flow of the reproduction of the out-of-group Move, the CCI state is firstly judged (Step S701). If it is the state except NMC, there is no operation mode corresponding to the out-of-group Move. Thus, the operation of the out-of-group Move is not done, and the operation is ended. On the other hand, if it is NMC, whether or not the out-of-group Move can be allowed is judged (Step S702).

Here, if the out-of-group Move is not allowed (Step S702: NG), the out-of-group Move cannot be done. Then, the operation is ended.

On the other hand, if the out-of-group Move is allowed (Step S702: OK), the common descrambling to the different group is applied, and the decoding is done (Step S703). After that, the reproducing process is done (Step S704). Whether or not the reproducing process is stopped is judged (Step S705). The reproducing process is continued until the stop. After the stop, the original recording information is erased (Step S706). The series of reproducing processes is ended.

By the way, the reproducing process and the erasing process may be alternately repeated for each short unit.

Furthermore, also in the case of the out-of-group Move from one DVD to another DVD, similarly to the case of the in-group Move, a direct recording is possible without the decoding on the reproducing side and the encryption processing on the recording side.

As detailed above by using the flowcharts of FIG. 8 to 13, the copying operation and the moving operation of the information between the electronic apparatuses in the group or between the electronic apparatuses over groups are strictly managed by introducing the group key corresponding to the network. Also, the treatment of the information beyond the group can be done within the predetermined condition. Also, the copy control using the group key has been described with regard to the DVD recorder. However, the above-mentioned copy control technique may be applied to an apparatus using a movable recording medium, for example, a magnetically recording/reproducing apparatus of a different disc recorder and cassette type.

Next, variants of the above-mentioned embodiment will be discussed. Incidentally, the explanation is made only to a part different from the above-mentioned embodiment, and is omitted to a part the same as the above-mentioned embodiment.

Figure 15:
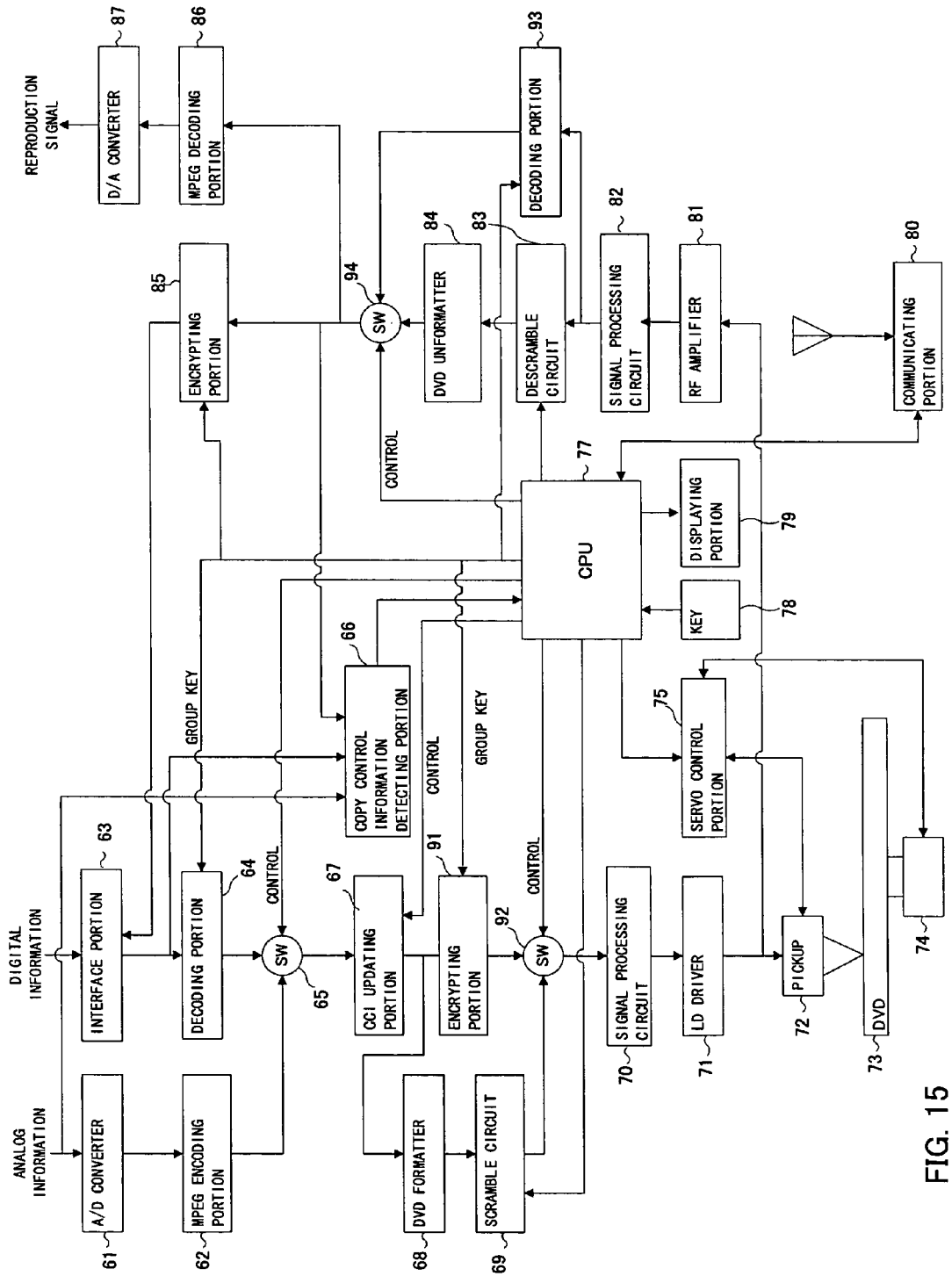
FIG. 15 is a block diagram illustrating the first variant of the embodiment shown in FIG. 7.

FIG. 15 illustrates a first variant of the embodiment of FIG 7. In the embodiment of FIG. 7, the copy control information detecting portion 66 inputs an output of the SW 65, and detects the copy control information of digital information. Nevertheless, if the copy control information accompanies the record information, without subjected to the encryption using the group key, the copy control information detecting portion 66 can input an output of the interface portion 63, and detect the copy control information of the digital information. Incidentally, if the copy control information is encrypted using the group key, the corresponding part of the copy control information may be decoded (or decrypted) using the group key and detected. Then, the detected part may be updated. Then, the updated part of the copy control information may be encrypted using the group key.

Figure 16:
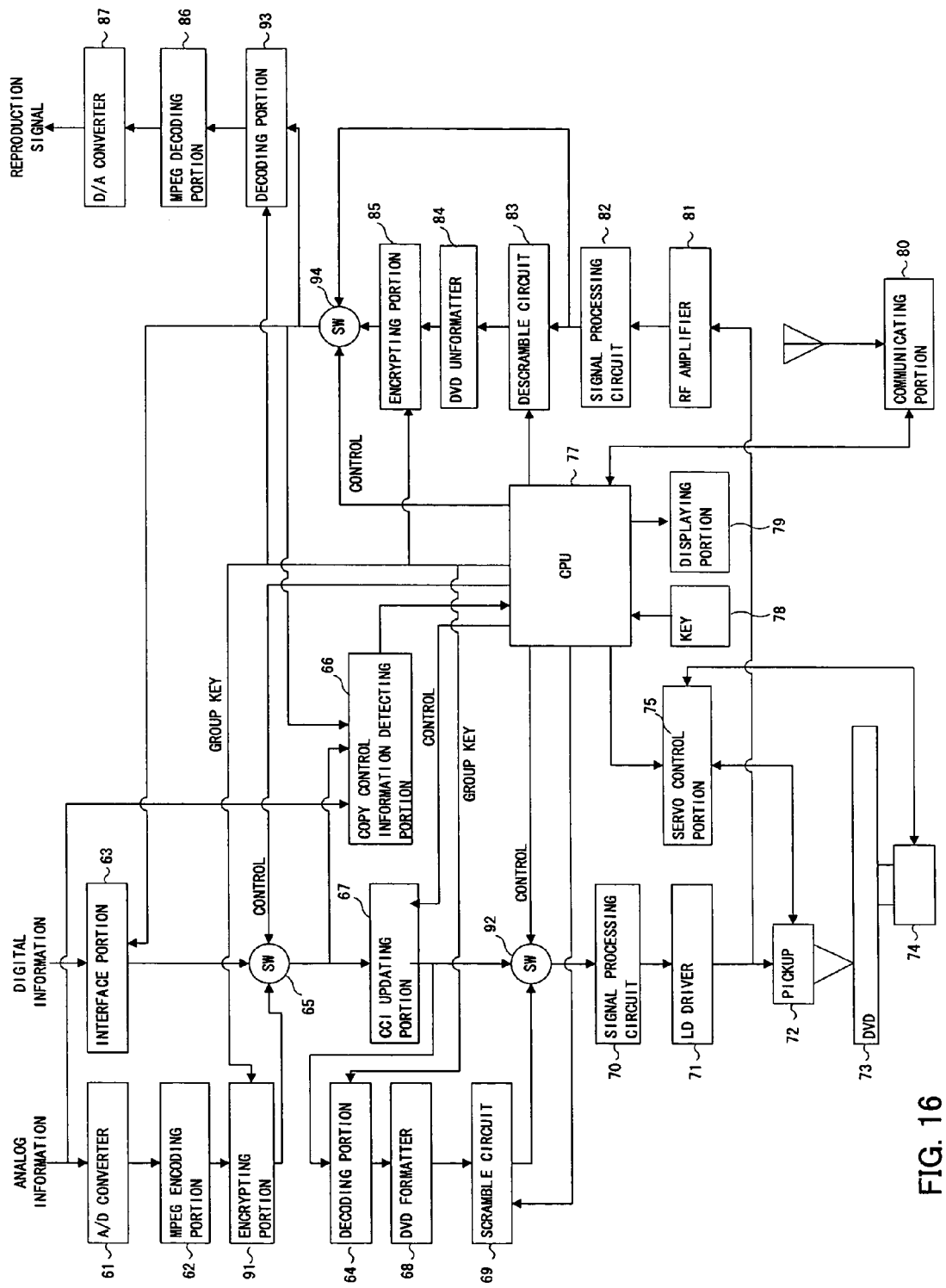
FIG. 16 is a block diagram illustrating the second variant of the embodiment shown in FIG. 7.

FIG. 16 illustrates a second variant of the embodiment of FIG. 7. According to this variant, it is possible to dispose the decoding portion 64 and the encrypting portion 85 at the input side of the DVD formatter 68 and the output side of the DVD unformatter 84, respectively. On the other hand, it is possible to dispose the encrypting portion 91 and the decoding portion 93 at the output side of the MPEG encrypting portion 62 and the input side of the MPEG decoding portion 86, respectively. Incidentally, if the copy control information is encrypted using the group key, the corresponding part of the copy control information may be decoded (or decrypted) using the group key and detected. Then, the detected part may be updated. Then, the updated part of the copy control information may be encrypted using the group key.

Figure 17:
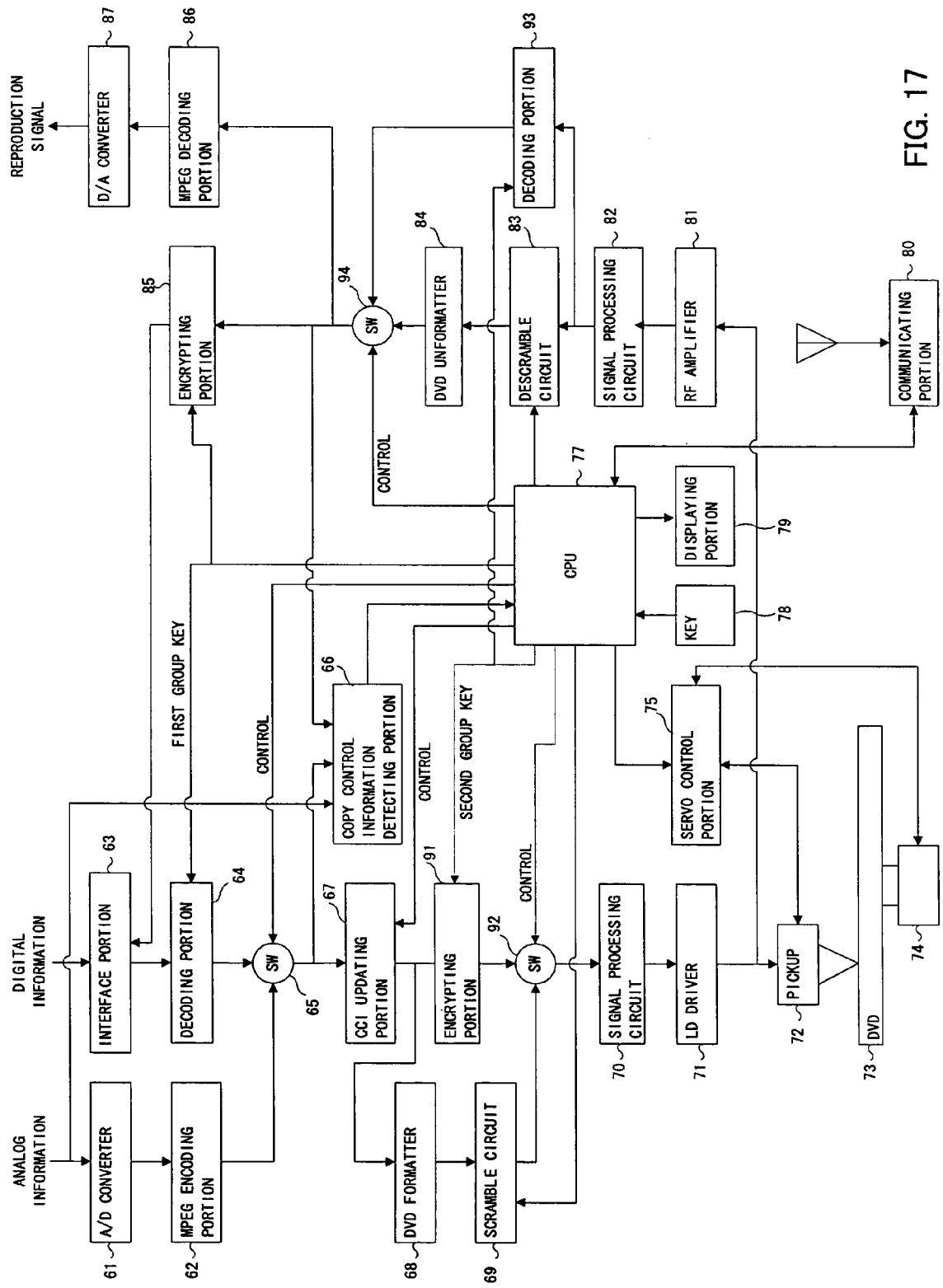
FIG. 17 is a block diagram illustrating the third variant of the embodiment shown in FIG. 7.

FIG. 17 illustrates a third variant of the embodiment of FIG. 7. According to this variant, if a group key used for the decoding portion 64 and the encrypting portion 85 is defined as the first group key, a group key used for the encrypting portion 91 and the decoding portion 93 may be defined as the second group key different from the first group key.

Figure 18:
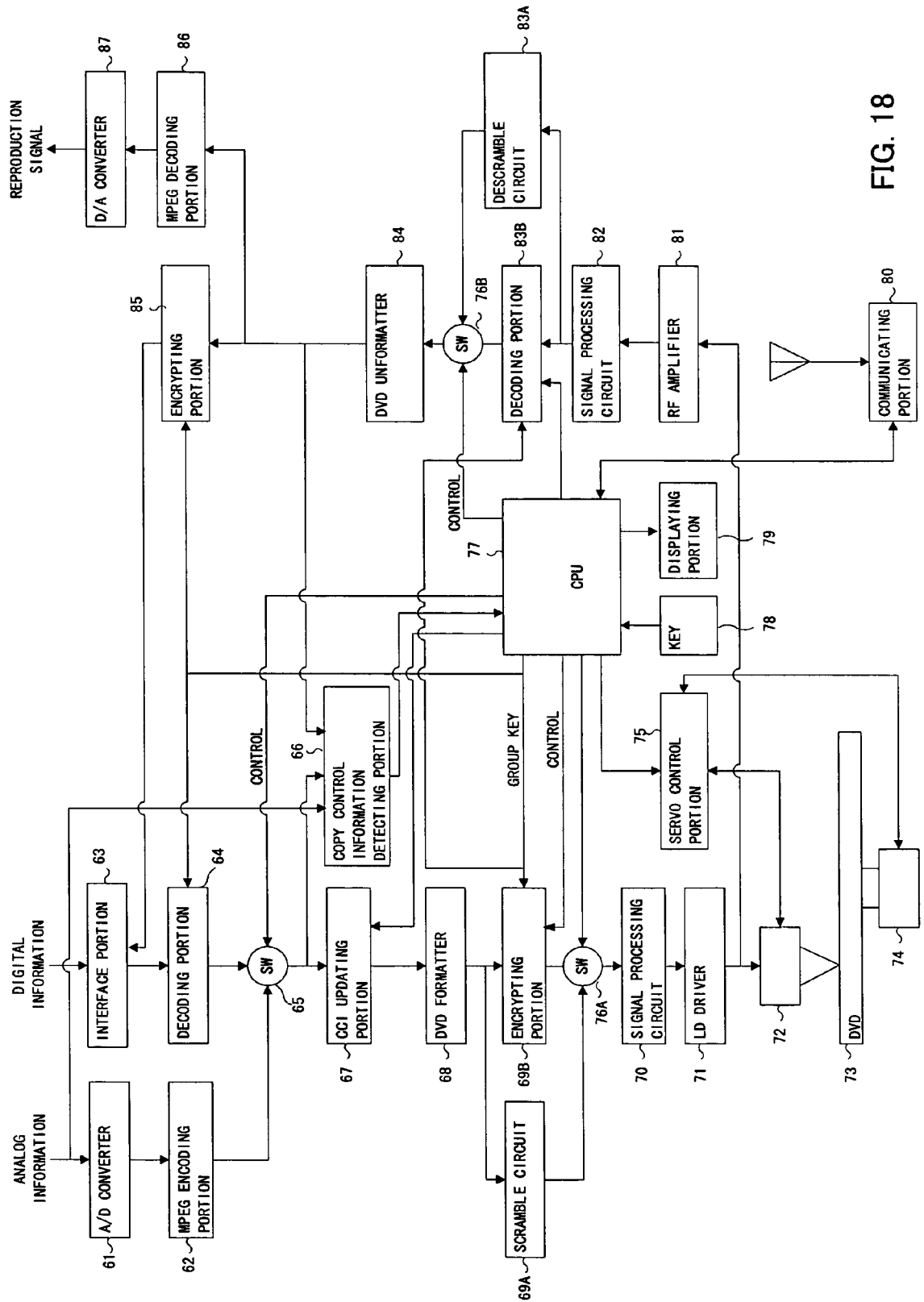
FIG. 18 is a block diagram illustrating the first variant of the embodiment shown in FIG. 6.

FIG. 18 illustrates a first variant of the embodiment of FIG. 6. According to the embodiment of FIG. 6, the key used for the encryption/decoding is switched by the scramble circuit 69 and the descramble circuit 83. Nevertheless, circuits per se may be switched. That is, as shown in the drawing, the scramble circuit 69 may be formed of a scramble circuit 69A and an encrypting portion 69B, the scramble circuit 69A being for a scrambling using a key in accordance with a common format that is common over groups, and the encrypting portion 69B being for encrypting the record information using the group key. The descramble circuit 83 may be formed of a descramble circuit 83A and a decoding circuit 83B, the descramble circuit 83A being for descrambling the record information using a key in accordance with a common format that is common over groups, and the decoding circuit 83B being for decoding the record information using the group key. These circuit outputs may be switched by the SW 76A and 76B.

Figure 19:
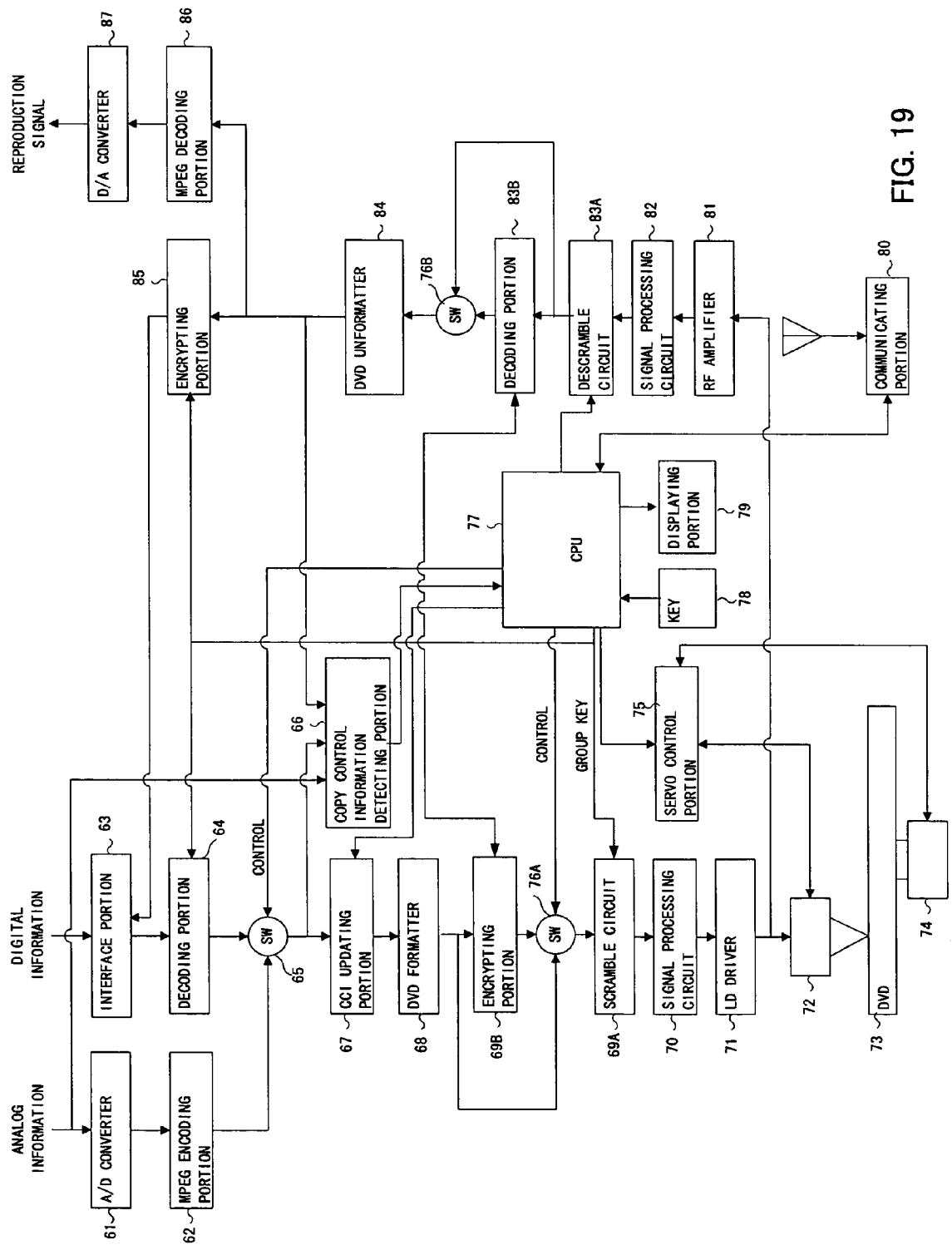
FIG. 19 is a block diagram illustrating the second variant of the embodiment shown in FIG. 6.
Figure 20:
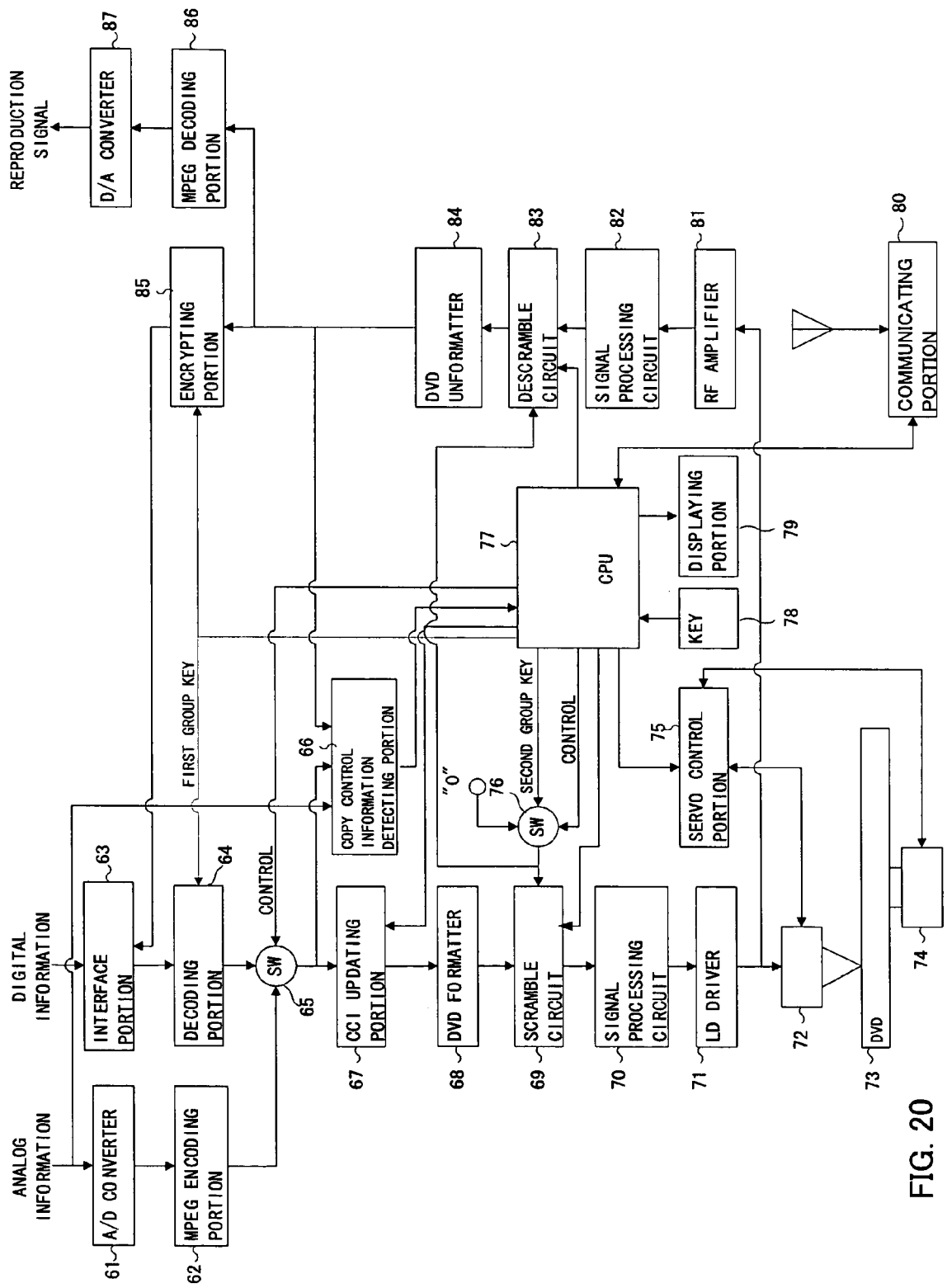
FIG. 20 is a block diagram illustrating the third variant of the embodiment shown in FIG. 6.

FIG. 19 illustrates a second variant of the embodiment of FIG. 6. As shown in the drawing, the encrypting portion 69B and the SW 76A may be disposed at the input side of the scramble circuit 69A, while the decoding portion 83B and the SW 76 may be disposed at the output side of the descramble circuit 83A, for switching the encrypting portion 69B and the decoding portion 83B in accordance with their application.

Figure 21:
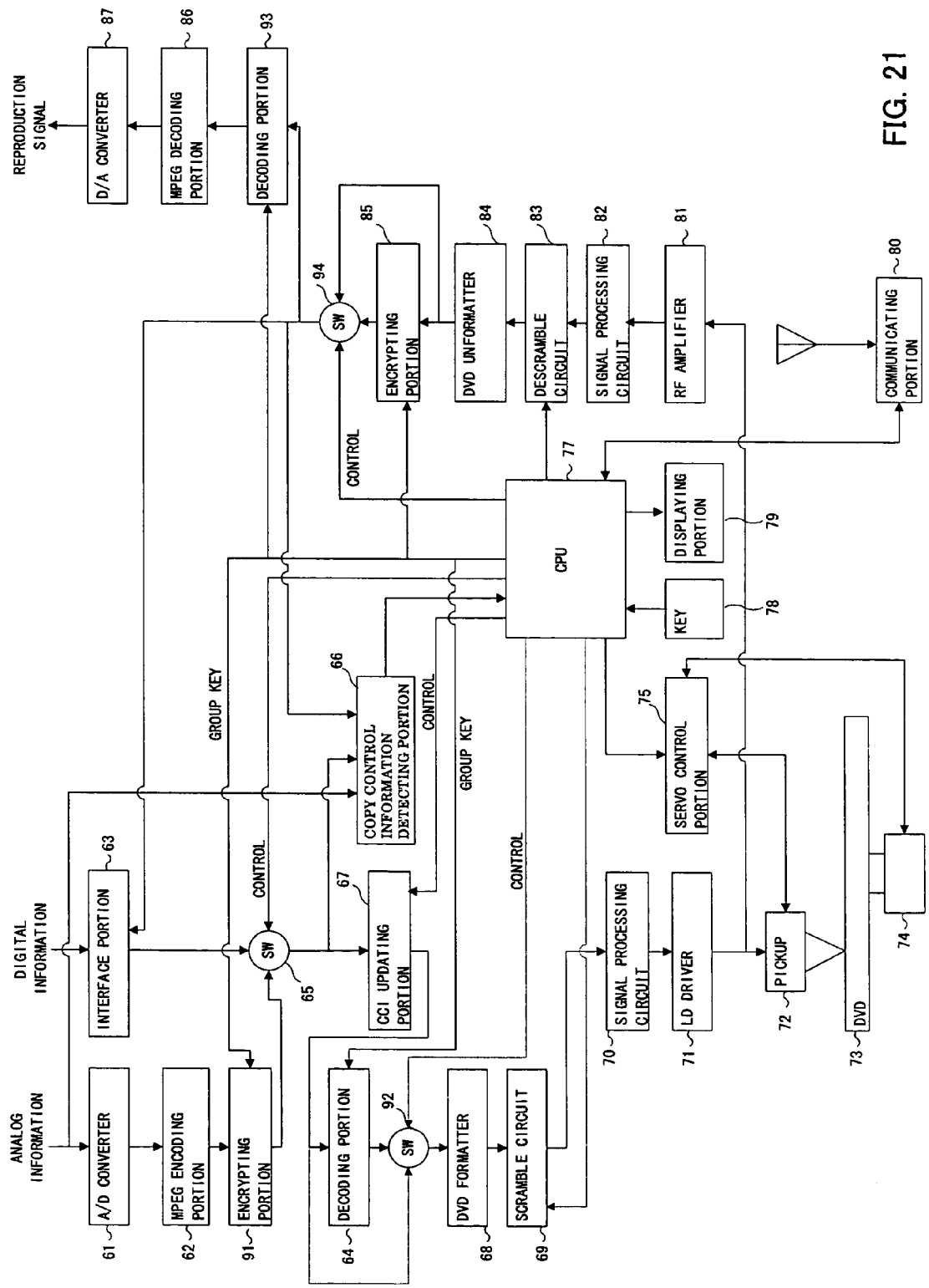
FIG. 21 is a block diagram illustrating a variant of the embodiment shown in FIG. 16.

FIG. 21 illustrates a further variant of the embodiment of FIG. 16 that is the third variant of the embodiment of FIG. 7. As shown in FIG. 16, instead of such an arrangement that the output of the CCI updating portion 67 and the output of the scramble circuit 69 is switched by the SW 92, whether the decoding portion 64 is used may be selected by the SW 92. Similarly, whether the encrypting portion 85 is used may be selected by the SW 95. In this arrangement, when the SW 92 is connected to the decoding portion 64 side, the record information outputted from the CCI updating portion 67 is decoded using the group key at the decoding portion 64, and converted into an inter-group common format by the DVD formatter 68 and the scramble circuit 69. When the SW 92 is connected to the opposite side, the record information outputted from the CCI updating portion 67 is converted into an inter-group common format, remaining in an encrypted state based on the group key.

The present invention is not limited to the above-mentioned embodiments, and may be modified within a range not departing from the essence or spirit of the invention read from the whole specification and the claims. Such a modified electronic apparatus control system and modified electronic apparatus control method are all encompassed within a technical concept of the present invention.

INDUSTRIAL APPLICABILITY

The present invention is applicable to a network system for transmitting and receiving information between or among various electronics such as a TV receiver, a video recorder, a DVD system, a personal computer and so on. Additionally, the present invention is applicable to various information communicating systems involving the copyright protection or the confidentiality of information.

The invention claimed is:

1. An electronic apparatus control system characterized in that said system comprises: an electronic apparatus on an output side for outputting information to a network covering a predetermined area; an electronic apparatus on an input side for receiving the information outputted to the network; and a controller for controlling said electronic apparatus on the output side and said electronic apparatus on the input side;

(i) said controller comprising:
a generating device for generating an encryption key peculiar to the network in order to encrypt the information flowing through the network;
a transmitting device for transmitting the generated encryption key to a plurality of said electronic apparatuses;
a transmission controlling device for controlling a transmission of the encryption key generated by said generating device; and
an obtaining device for obtaining a license information related to the encryption key by accessing a management center for managing the license information related to the encryption key be accessing a management center for managing the license information to be provided, (ii) said electronic apparatus on the output side comprising:
a memory device for storing the encryption key transmitted from said controller; and
an encrypting device for encrypting the information in accordance with the encryption key, (iii) said electronic apparatus on the input side comprising:
a memory device for storing the encryption key transmitted from said controller; and a decoding device for decoding the encrypted information in accordance with the encryption key, and said transmission controlling device controls the transmission of the encryption key at said transmitting device on the basis of the obtained license information, the license information includes information on the transmission number of the encryption key, and the transmission controlling device controls the transmission number of the encryption key at the transmitting device on the basis of the information on the transmission number of the encryption key.

2. The electronic apparatus control system according to claim 1, characterized in that said controller has the function of a cellular phone.

3. The electronic apparatus control system according to claim 2, characterized in that said generating device generates the encryption key on the basis of the peculiar number of the cellular phone.

4. The electronic apparatus control system according to claim 1, characterized in that said controller has the function of the remote control device comprising an operating unit for controlling the operation of the plurality of electronic apparatuses.

5. The electronic apparatus control system according to claim 1, characterized in that said electronic apparatus on the output side further comprises a forbidding unit for forbidding the output of information to be flown through the network to the network, until the encryption key is stored in the memory device.

6. The electronic apparatus control system according to claim 1, characterized in that the network is established with a home environment as the predetermined area.

7. The electronic apparatus control system according to claim 1, characterized in that the network is connected to an external network through a communication unit.

8. An electronic apparatus control system characterized in that said system comprises: an electronic apparatus on an output side for outputting information to a network covering a predetermined area; an electronic apparatus on an input side for receiving the information outputted to the network; and a controller for controlling said electronic apparatus on the output side and said electronic apparatus on the input side, (i) said controller comprising:

a generating device for generating an encryption key peculiar to the network in order to encrypt the information flowing through the network;

a transmitting device for transmitting the generated encryption key to a plurality of said electronic apparatuses;

a transmission controlling device for controlling a transmission of the encryption key generated by said generating device; and a loading unit for loading therein a detachable memory device in which a license information is stored, (ii) said electronic apparatus on the output side comprising:

a memory device for storing the encryption key transmitted from said controller; and an encrypting device for encrypting the information in accordance with the encryption key, (iii) said electronic apparatus on the input side comprising:

a memory device for storing the encryption key transmitted from said controller; and a decoding device for decoding the encrypted information in accordance with the encryption key, and said transmission controlling device for controlling the transmission of the encryption key at the transmitting device on the basis of the license information stored in the detachable memory device loaded in the loading unit, the license information includes information on the transmission number of the encryption key, and the transmission controlling device controls the transmission number of the encryption key at the transmitting device on the basis of the information on the transmission number of the encryption key.

* * * * *